(12) United States Patent
Xu et al.

(10) Patent No.: US 8,575,063 B2
(45) Date of Patent: Nov. 5, 2013

(54) NICKEL-BASED REFORMING CATALYSTS

(75) Inventors: Wen-Qing Xu, Medfield, MA (US);
David Beijia Xu, Medfield, MA (US)

(73) Assignee: Hongying He, Medfield, MA (US)

( * ) Notice: Subject to any disclaimer, the term of this patent is extended or adjusted under 35 U.S.C. 154(b) by 287 days.

(21) Appl. No.: 12/606,459

(22) Filed: Oct. 27, 2009

(65) Prior Publication Data

US 2010/0105546 A1    Apr. 29, 2010

Related U.S. Application Data

(60) Provisional application No. 61/108,562, filed on Oct. 27, 2008.

(51) Int. Cl.
*B01J 23/00* (2006.01)
*B01J 21/00* (2006.01)

(52) U.S. Cl.
USPC ............ 502/335; 502/337; 502/415; 502/439

(58) Field of Classification Search
USPC .......................... 502/335, 337, 415, 43.9, 439
See application file for complete search history.

(56) References Cited

U.S. PATENT DOCUMENTS

| | | | | |
|---|---|---|---|---|
| 4,499,203 A * | 2/1985 | Toulhoat et al. | ............... | 502/247 |
| 4,588,709 A * | 5/1986 | Morales et al. | ............... | 502/314 |
| 5,266,300 A * | 11/1993 | Harrison | ............... | 423/628 |
| 5,352,835 A * | 10/1994 | Dai et al. | ............... | 564/480 |
| 5,496,788 A * | 3/1996 | Domesle et al. | ............... | 502/333 |
| 5,545,602 A * | 8/1996 | Nelson et al. | ............... | 502/314 |
| 5,942,645 A * | 8/1999 | Rutter et al. | ............... | 568/832 |
| 5,972,832 A * | 10/1999 | Shi et al. | ............... | 502/327 |
| 6,033,556 A * | 3/2000 | Didillon et al. | ............... | 208/253 |
| 6,043,187 A * | 3/2000 | Harle et al. | ............... | 502/313 |
| 6,383,974 B1 * | 5/2002 | Ishida et al. | ............... | 502/305 |
| 6,387,248 B2 * | 5/2002 | Sherwood et al. | ...... | 208/216 PP |
| 6,436,280 B1 * | 8/2002 | Harle et al. | ............... | 208/216 R |
| 7,578,986 B2 * | 8/2009 | Hampden-Smith et al. | .. | 423/220 |
| 7,923,406 B2 * | 4/2011 | Potapova et al. | ............ | 502/325 |
| 2002/0000397 A1 * | 1/2002 | Sherwood, Jr. et al. | | 208/216 PP |
| 2005/0101480 A1 * | 5/2005 | Ackerman et al. | ............ | 502/313 |
| 2008/0193370 A1 * | 8/2008 | Hampden-Smith et al. | .. | 423/651 |

* cited by examiner

*Primary Examiner* — Cam N. Nguyen

(57) ABSTRACT

The present invention relates unique pore structures in nickel supported on alumina with the negligible formation of macropores. Incorporation of additional elements stabilizes the pore structure of the nickel supported on alumina. Additional element(s) were then further added into the nickel-supported materials. These additional element(s) further stabilize the pore structures under heating conditions. The improvements of pore structure stability under heating conditions and negligible presence of macropores limit the sintering of nickel metal to a mechanism of impeded diffusion. The negligible presence of macropores also limits the deposition of alkali metal hydroxide(s)/carbonate(s) on the outer shell of the catalyst pellet in the molten carbonate fuel cells. Both the negligible presence of macropores and improvement in pore structure stability allow for prolonging the catalyst life of these nickel supported on alumina catalysts of the present invention for reforming hydrocarbons.

41 Claims, 6 Drawing Sheets

Pore Size Distributions of RefCat 2.0 that was calcined at 200°C for 2 hour in nitrogen and 450°C for 3 hours in air.

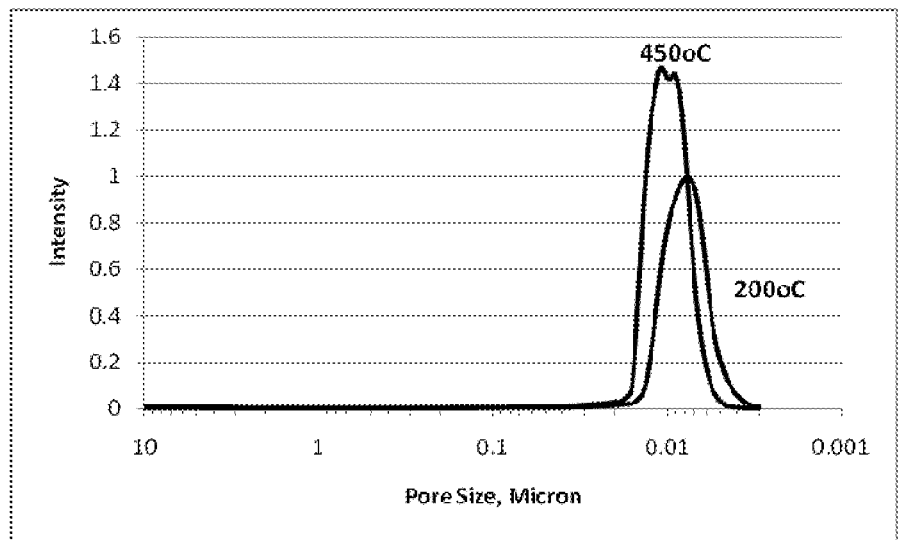
Figure 1. Pore Size Distributions of RefCat 2.0 that was calcined at 200°C for 2 hour in nitrogen and 450°C for 3 hours in air.
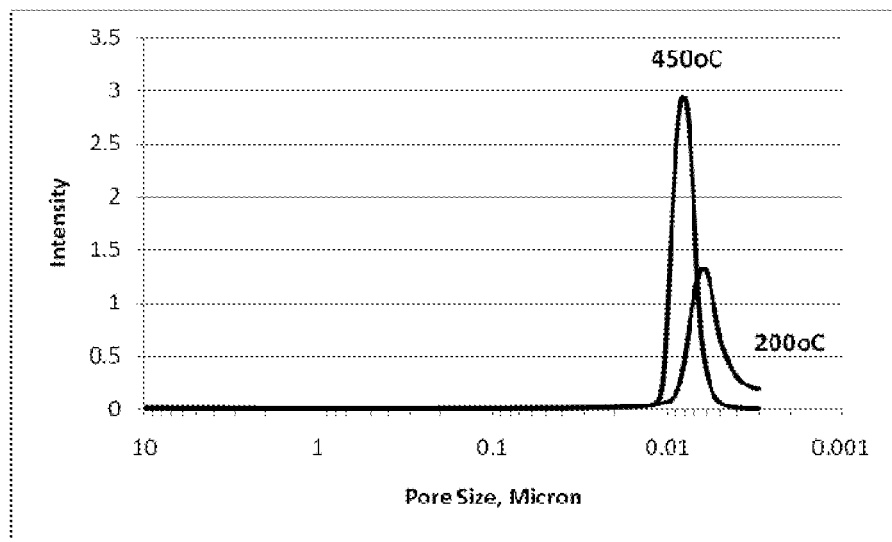
Figure 2. Pore Size Distributions of RefCat 3.0 that was calcined at 200°C for 2 hour in nitrogen and 450°C for 3 hours in air.

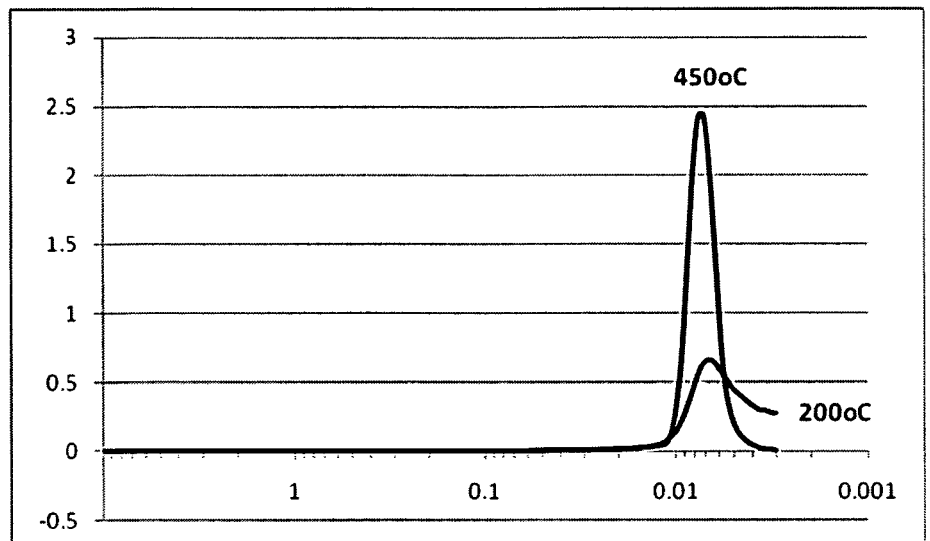
Figure 3. Pore Size Distributions of RefCat 4.0 that was calcined at 200°C for 2 hour in nitrogen and 450°C for 3 hours in air.
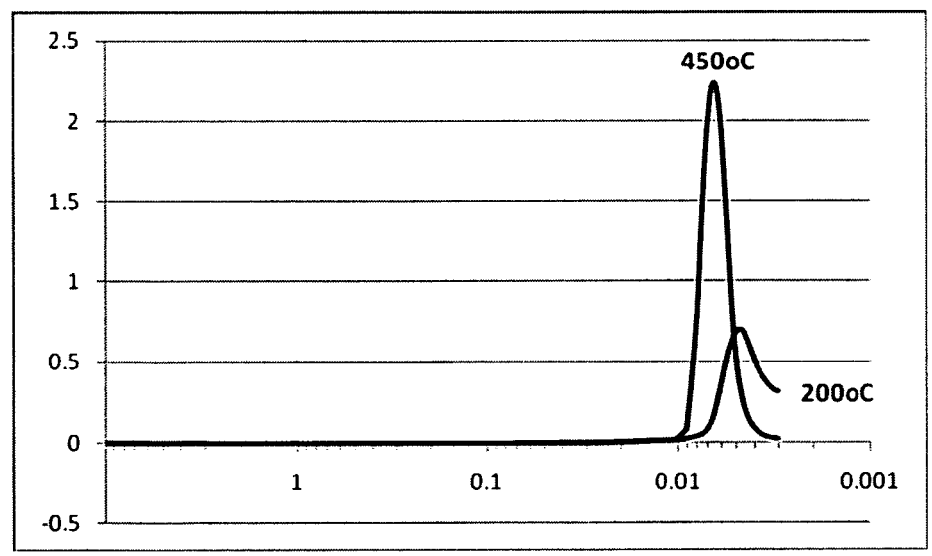
Figure 4. Pore Size Distributions of RefCat 5.0 that was calcined at 200°C for 2 hour in nitrogen and 450°C for 3 hours in air.

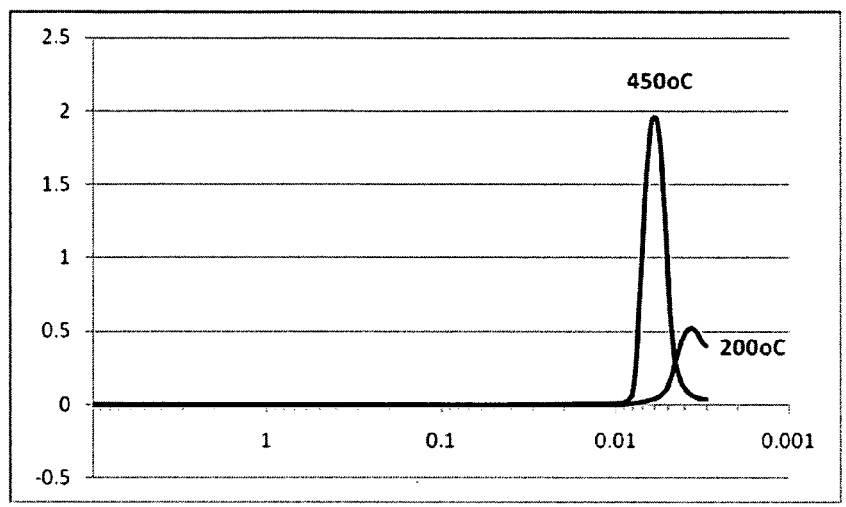
Figure 5. Pore Size Distributions of RefCat 6.0 that was calcined at 200°C for 2 hour in nitrogen and 450°C for 3 hours in air.

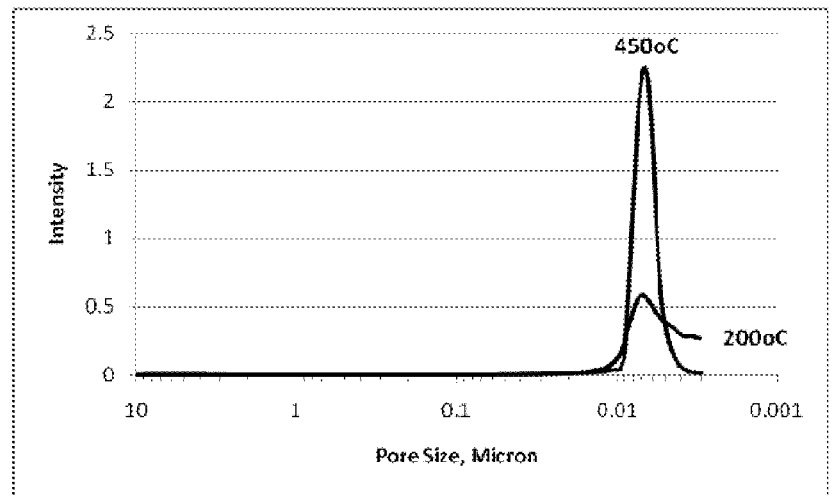
Figure 6. Pore Size Distributions of RefCat 7.0 that was calcined at 200°C for 2 hour in nitrogen and 450°C for 3 hours in air.
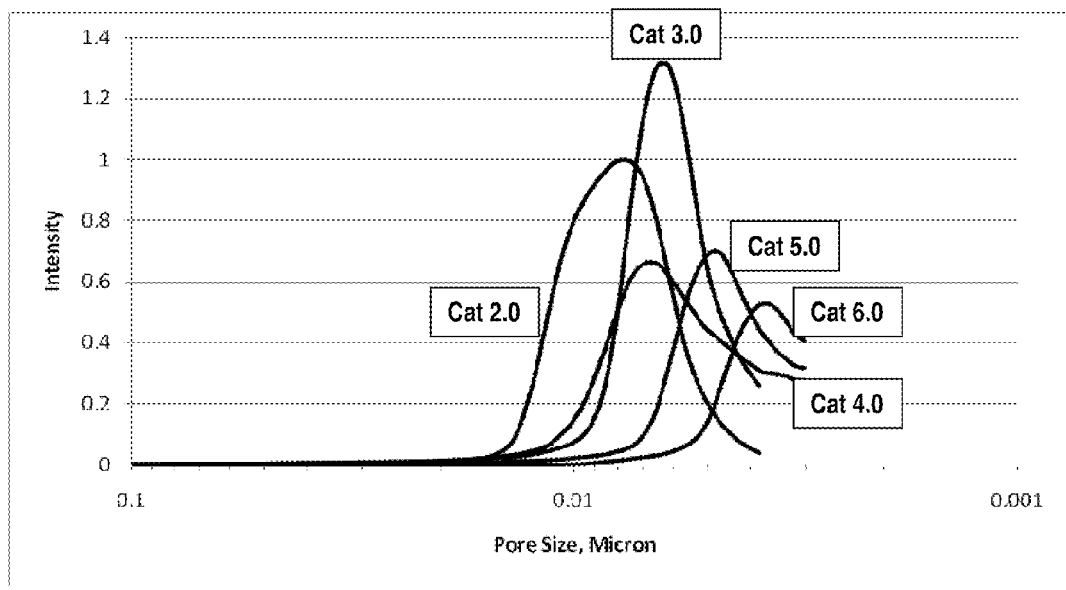
Figure 7. Comparisons of Pore Size Distributions of RefCat 2.0, RefCat 3.0, RefCat 4.0, RefCat 5.0 and RefCat 6.0 that were calcined in nitrogen for 2 hours at 200°C.

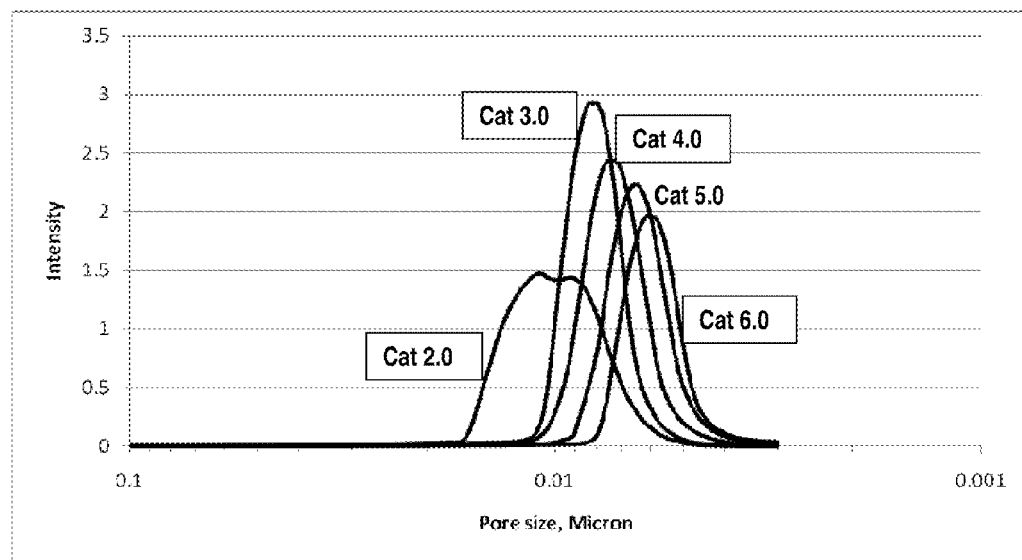
Figure 8. Comparisons of Pore Size Distributions of RefCat 2.0, RefCat 3.0, RefCat 4.0, RefCat5.0, and RefCat 6.0 that were calcined in air for 3 hours at 450°C.

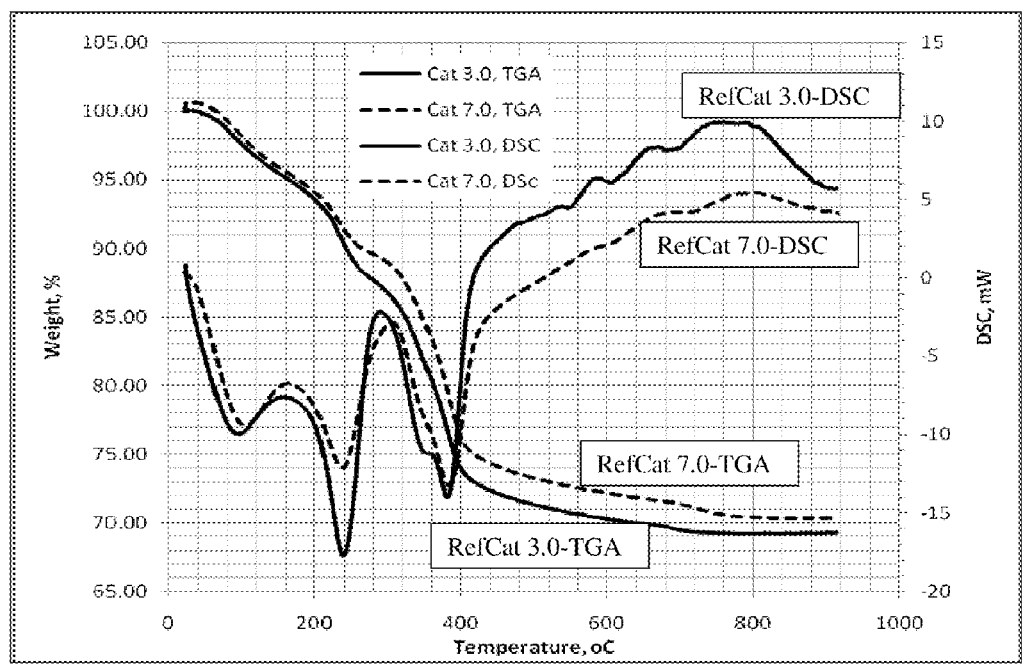
Figure 9. TGA-DSC Analysis of RefCat 3.0 and RefCat 7.0 (6 times DSC Signal of RefCat 7.0).

NICKEL-BASED REFORMING CATALYSTS

CROSS-REFERENCE TO PRIOR RELATED APPLICATION

This application claims benefit of the filing date of U.S. Provisional Application No. 61/108,562, filed on Oct. 27, 2008, the entire disclosure of which is incorporated herein by reference.

FIELD OF THE INVENTION

This invention relates to the chemical compositions and pore structures of nickel-based materials that are used as catalysts for the catalytic reforming of hydrocarbons. More particularly, this invention relates to nickel-based reforming catalysts and their favorable pore structures for the reforming of hydrocarbons to produce syngas. Furthermore, the invented nickel based catalysts have unique compositions and pore structures that facilitate a long catalyst life for syngas production (for fuel cells or other applications) under conditions of heat, steam, and electrolyte deposition.

BACKGROUND OF THE INVENTION

The reforming of hydrocarbons to produce a mixture of hydrogen, carbon monoxide, carbon dioxide, hydrocarbons, and water, which is called synthesis gas (syngas), has been practiced by various industries for a long time. Reforming can be done with steam (known as steam reforming, endothermic) to produce syngas with high $H_2$ to CO ratios, with oxygen for partial oxidation of methane (called partial oxidation, exothermic), and with carbon dioxide (known as carbon dioxide reforming, endothermic) for production of syngas with low $H_2$ to CO ratios. Syngas produced by the reforming of hydrocarbons in these manners has been widely utilized in the production of ammonia, methanol, hydrogen, liquid fuels, oxygenated compounds, etc.

Hydrogen generated from the reforming of hydrocarbons has also been used as fuel in fuel cells where hydrogen and oxygen react to form water. In this capacity, they generate electricity with a much higher efficiency than when compared to their conventional usage as fuels for energy purposes. In certain cases, such as proton-exchanged membrane fuel cells, hydrogen must be extremely pure in order to be utilized as fuel. However, for Molten Carbonate Fuel Cells, hydrogen in the mixture of syngas can be directly utilized as fuel to generate electricity; carbon dioxide and water molecules do not need to be removed from the gas stream. Therefore, syngas containing hydrogen for molten carbonate fuel cells is usually produced in-situ either by external reforming or internal reforming. Internal reforming for molten carbonate fuel cells can be carried out in two different methods: direct internal reforming and indirect internal reforming.

In molten carbonate fuel cells, $LiAlO_2$ carrying electrolytes (mixture of $Li_2CO_3$, $Na_2CO_3$, and $K_2CO_3$) often cause electrical resistance in the electrolyte matrix. During power generation, internal electrical resistance in molten carbonate fuel cells generates undesirable heat. This undesirable heat must be removed in order for the fuel cells to remain at an operational temperature. In addition, the reforming of hydrocarbons to produce syngas is an endothermic reaction system that requires external heat to sustain the catalytic reactions. Therefore, it is highly advantageous and efficient to adapt internal reforming in order to use the undesirable heat generated from fuel cells to heat the reactor of hydrocarbon reforming for the production of hydrogen as fuel for fuel cells.

There are difficulties in the direct internal reforming of hydrocarbons for molten carbonate fuel cells that arise from the contamination of reforming catalysts via constant diffusion and deposition of the electrolyte vapors of Li—Na—K hydroxide(s) and/or carbonate(s). This electrolyte deposition continuously deactivates the reforming catalysts throughout the life of catalyst usage, which results in a shortened catalyst life.

At the same time, the catalytic reforming of hydrocarbons is usually carried out at temperatures ranging from 300° C. to 900° C., even up to 1000° C. The presence of both heat and steam leads to aging of the reforming catalysts, a loss of surface area for active components and/or support materials, and is sometimes accompanied by phase transformation. Losing the surface area of the active components leads to the loss of the catalytic activity of hydrocarbon reforming, which also results in a shortened catalyst life.

The presence of sulfur-containing molecules in the hydrocarbon stream leads to the deposition of sulfur-related chemicals. Reforming catalysts are usually sensitive to the deposition of sulfur-related chemicals, which leads to the deactivation of the reforming catalysts. Therefore, the sulfur content in the feedstock of hydrocarbons is usually removed to a level of less than 100 ppb; most often, the sulfur content must be reduced to only a few ppb for viable usage in fuel cells. Sulfur poisoning from the hydrocarbon feeds can also result in a shortened catalyst life.

Another factor that causes deactivation of the reforming catalyst is coke formation (carbon deposit) on the reforming catalysts. The presence of steam at a relatively high temperature usually eliminates or minimizes the issue of coking.

A combination of deactivations caused by the presence of heat, the presence of steam, and the deposition of electrolytes causes reforming catalysts to lose their capacity for activity until eventually, they are no longer efficient enough to allow the fuel cells to function normally. Extending the life of reforming catalysts is a key challenge in the development of molten carbonate fuel cells with prolonged operational lifespan. A longer lifespan for molten carbonate fuel cells allows for a more efficient, economical, and environmentally sound method of energy production.

The current invention concerns new catalysts that are able to sustain prolonged catalyst life as reforming catalysts as a result of preferred compositions and pore structures.

SUMMARY OF THE INVENTION

In this invention, the pores of a nickel-based catalyst are classified into four different categories, including inter-particle pores, macropores, mesopores and micropores. Inter-particle pores are defined as pores having sizes greater than 24,000 angstroms. Micropores are defined as pores having sizes smaller than 30.2 angstroms. In certain embodiments of the invention, macropores are defined as pores having sizes that are greater than 603 angstroms and up to 24,000 angstroms, while mesopores are defined as pores having sizes ranging between 30.2 angstroms and 603 angstroms. In other embodiments, macropores are defined as pores having sizes that are greater 452 angstroms and up to 24,000 angstroms, while mesopores are defined as pores having sizes ranging between 30.2 angstroms and 452 angstroms. In some embodiments, macropores are defined as pores having sizes that are greater than 362 angstroms and up to 24,000 angstroms, while mesopores are defined as pores having sizes ranging between 30.2 angstroms and 362 angstroms. Finally, in some embodiments, the macropores are defined as pores having sizes that are greater than 259 angstroms and up to 24,000 angstroms, while mesopores are defined as pores having sizes ranging between 30.2 angstroms and 259 angstroms. As described herein below, a pore structure of the catalyst that includes a larger number of smaller pores and a negligible amount of larger macropores is desired. Accordingly, the catalysts with mesopores having a smaller size exhibit a more desired pore structure for purposes of the current invention.

As described herein below, the negligible presence or negligible amount of macropores in the catalysts is defined as a ratio of the mesopore volume to the macropore volume. In the embodiments in which the mesopores are defined as pores having sizes between 30.2 and 603 angstroms, negligible amount, or negligible presence, of macropores is defined as a ratio of mesopore volume of pores between 30.2 and 603 angstroms to macropore volume of pores greater than 603 angstroms and up to 24,000 being greater than 90. In such embodiments, the ratio of mesopore volume to macropore volume is preferably greater than 105, and more preferably greater than 120. In the embodiments in which the mesopores are defined as pores having sizes between 30.2 and 452 angstroms, negligible amount, or negligible presence, of macropores is defined as a ratio of mesopore volume of pores between 30.2 and 452 angstroms to macropore volume of pores greater than 452 angstroms and up to 24,000 being greater than 65. In such embodiments, the ratio of mesopore volume to macropore volume is preferably greater than 75, and more preferably greater than 85. In the embodiments in which the mesopores are defined as pores having sizes between 30.2 and 362 angstroms, negligible amount, or negligible presence, of macropores is defined as a ratio of mesopore volume of pores between 30.2 and 362 angstroms to macropore volume of pores greater than 362 angstroms and up to 24,000 being greater than 55. In such embodiments, the ratio of mesopore volume to macropore volume is preferably greater than 65, and more preferably greater than 75. Finally, in the embodiments in which the mesopores are defined as pores having sizes between 30.2 and 259 angstroms, negligible amount, or negligible presence, of macropores is defined as a ratio of mesopore volume of pores between 30.2 and 259 angstroms to macropore volume of pores greater than 259 angstroms and up to 24,000 being greater than 30. In such embodiments, the ratio of mesopore volume to macropore volume is preferably greater than 40, and more preferably greater than 50.

The data for these ratios for the catalysts of the present invention, as shown in Table 3 below, show that the catalysts of the present invention have pores mainly distributed in the mesopore size range with a negligible amount of macropores.

This invention relates to a material of nickel supported on alumina and its precursor possessing a unique pore structure. This two-element material comprised of nickel and aluminum has pores that are mainly distributed in the range of mesopores with negligible amounts of macropores. In the present invention, the material of the two-element system comprised of aluminum and nickel is used as a reforming catalyst. This material is also used as a reforming catalyst in molten carbonate fuel cells. The negligible presence of macropores in the two element catalyst of the present invention is preferred, as it prolongs the catalyst life by eliminating the nickel sintering inside the macropores via unimpeded diffusion mechanism and limiting the deposition of the alkali metal hydroxide(s)/carbonate(s) on the outer shell of the catalyst pellet.

It was found that the stability of pore structure of nickel supported on alumina is improved by incorporating a third element. The third element comprises one of the elements from transition metals, Group IVB, Group VB, Group VIB, Group IIIB including Lanthanum Group and Rare Earth Metal Group, Group II Alkali Earth Metals, Group IIIA, Group IVA, antimony and bismuth. It is preferable that the third element comprises one of the elements from a group of titanium, zirconium, hafnium, yttrium, lanthanum, cerium, praseodymium, neodymium, boron, silicon, tin, antimony, bismuth, niobium, molybdenum, tungsten, magnesium, calcium, strontium, barium, etc. Such three-element material comprising nickel and aluminum of current invention comprises pores mainly distributed in the size range of mesopores (30.2 angstroms to 603 angstroms, or to 452 angstroms, or 362 angstroms or 259 angstroms as defined above) with negligible amounts of macropores (greater than 603 angstroms, or 452 angstroms, or 362 angstroms or 259 angstroms and up to 24,000 angstroms, as defined above). The material of three-element system comprising aluminum, nickel, and the third element of the present invention is used as a reforming catalyst. The material of the three-element system comprises aluminum, nickel and the third element of the present invention is also used as a reforming catalyst in molten carbonate fuel cells. The negligible presence of macropores of the three element catalyst comprising nickel, aluminum, and a third element of the present invention is preferred to prolong the catalyst life by elimination of nickel sintering inside the macropores via unimpeded diffusion mechanism and limiting the deposition of alkali metal hydroxide(s)/carbonate(s) on the outer shell of the catalyst pellet. The improvement in pore structure stability of the three-element material comprising nickel, aluminum, and a third element limits the sintering of nickel metal inside the mesopores and micropores via a mechanism of impeding diffusion. The improvement in the pore structure stability also limits the deposition of alkali metal hydroxide(s)/carbonate(s) on the outer shell of the catalyst pellet. Both of these factors provide for a prolonged catalyst life.

It was also found that the stability of pore structure of nickel supported on alumina comprising nickel, aluminum, and a third element is further improved by incorporating a forth element. The forth element comprises one of the elements from transition metals, Group IVB, Group VB, Group VIB, Group IIIB including Lanthanum Group and Rare Earth Metal Group, Group II Alkali Earth Metals, Group IIIA, Group IVA, antimony and bismuth. It is preferable that the forth element comprises one of the elements from titanium, zirconium, hafnium, yttrium, lanthanum, cerium, praseodymium, neodymium, boron, silicon, tin, antimony, bismuth, niobium, molybdenum, tungsten, magnesium, calcium, strontium, barium, etc. Such four-element material comprises nickel, aluminum, a third element, and a forth element of current invention comprises pores mainly distributed in the size range of mesopores (30.2 angstroms to 603 angstroms, or to 452 angstroms, or 362 angstroms or 259 angstroms as defined above) with negligible amounts of macropores (greater than 603 angstroms, or 452 angstroms, or 362 angstroms or 259 angstroms and up to 24,000 angstroms, as defined above). The material of four-element system comprising aluminum, nickel, a third element, and a forth element of the present invention is used as a reforming catalyst. The material of four-element system comprising aluminum, nickel, a third element and a fourth element of the present invention is also used as a reforming catalyst in the molten carbonate fuel cells. The negligible presence of macropores of the four-element catalyst comprising nickel, aluminum, a third element, and a forth element of the present invention is preferred to prolong the catalyst life by elimination of nickel sintering inside the macropores via unimpeded diffusion mechanism and limiting the deposition of alkali metal hydroxide(s)/carbonate(s) on the outer shell of the catalyst pellet. The improvement in stability of the pore structure of the present invention limits the sintering of nickel metal inside the mesopores and micropores via a mechanism of impeding diffusion and the deposition of alkali metal hydroxide(s)/carbonate(s) on the outer shell of the catalyst pellet for a prolonged catalyst life.

It was also found that the stability of pore structure of nickel supported on alumina comprising nickel, aluminum, a third element, and a forth element is further improved by incorporating a fifth element. The fifth element comprises one of the elements from transition metals, Group IVB, Group VB, Group VIB, Group IIIB including Lanthanum Group and Rare Earth Metal Group, Group II Alkali Earth Metals, Group IIIA, Group IVA, antimony and bismuth. It is preferred that the fifth element comprises one of the elements from titanium, zirconium, hafnium, yttrium, lanthanum, cerium, praseodymium, neodymium, boron, silicon, tin, antimony, bismuth, niobium, molybdenum, tungsten, magnesium, calcium, strontium, barium, etc. Such five-element material comprising nickel, aluminum, a third element, a forth element, and a fifth element of current invention comprises pores mainly distributed in the size range of mesopores (30.2 angstroms to 603 angstroms, or to 452 angstroms, or 362 angstroms or 259 angstroms as defined above) with negligible amounts of macropores (greater than 603 angstroms, or 452 angstroms, or 362 angstroms or 259 angstroms and up to 24,000 angstroms, as defined above). The material of five-element system comprising aluminum, nickel, a third element, a forth element, and fifth element of the present invention is used as a reforming catalyst. The material of the five-element system comprising aluminum, the third element, the fourth element and the fifth element of the present invention is also used as a reforming catalyst in molten carbonate fuel cells. The negligible presence of macropores of the five-element catalyst comprising nickel, aluminum, a third element, a forth element, and a fifth element of the present invention is preferred to prolong the catalyst life by elimination of nickel sintering inside the macropores via unimpeded diffusion mechanism and limiting the deposition of alkali metal hydroxide(s)/carbonate(s) on the outer shell of the catalyst pellet. The improvement in stability of the pore structure of the present invention limits the sintering of nickel metal inside the mesopores and micropores via a mechanism of impeding diffusion and the deposition of alkali metal hydroxide(s)/carbonate(s) on the outer shell of the catalyst pellet for a prolonged catalyst life.

It was also found that the stability of pore structure of nickel supported on alumina comprising nickel, aluminum, a third element, a forth element, and a fifth element is further improved by incorporating a sixth element. The sixth element comprises one of the elements from transition metals, Group IVB, Group VB, Group VIB, Group IIIB including Lanthanum Group and Rare Earth Metal Group, Group II Alkali Earth Metals, Group IIIA, Group IVA, antimony and bismuth. It is preferred that the sixth element comprises one of the elements from titanium, zirconium, hafnium, yttrium, lanthanum, cerium, praseodymium, neodymium, boron, silicon, tin, antimony, bismuth, niobium, molybdenum, tungsten, magnesium, calcium, strontium, barium, etc. Such six-element material comprising nickel, aluminum, a third element, a forth element, a fifth element, and a sixth element of current invention comprises pores mainly distributed in the range of mesopores (30.2 angstroms to 603 angstroms, or to 452 angstroms, or 362 angstroms or 259 angstroms as defined above) with negligible amounts of macropores (greater than 603 angstroms, or 452 angstroms, or 362 angstroms or 259 angstroms and up to 24,000 angstroms, as defined above). The material of six-element system comprising aluminum, nickel, a third element, a forth element, a fifth element, and a sixth element of the present invention is used as a reforming catalyst. The material of the six-element system comprising aluminum, nickel, the third element, the fourth element, the fifth element and the sixth element is also used as a reforming catalyst in the molten carbonate fuel cells. The negligible presence of macropores of the six-element catalyst comprising nickel, aluminum, a third element, a forth element, a fifth element, and a sixth element of the present invention is preferred to prolong the catalyst life by elimination of nickel sintering inside the macropores via unimpeded diffusion mechanism and limiting the deposition of alkali metal hydroxide(s)/carbonate(s) on the outer shell of the catalyst pellet. The improvement in stability of the pore structure of the present invention limits the sintering of nickel metal inside the mesopores and micropores via a mechanism of impeding diffusion and the deposition of alkali metal hydroxide(s)/carbonate(s) on the outer shell of the catalyst pellet for a prolonged catalyst life.

It was also found that the stability of pore structure of nickel supported on alumina comprising nickel, aluminum, a third element, a forth element, a fifth element, and a sixth element is further improved by incorporating a seventh element. The seventh element comprises one of the elements from transition metals, Group IVB, Group VB, Group VIB, Group IIIB including Lanthanum Group and Rare Earth Metal Group, Group II Alkali Earth Metals, Group IIIA, Group IVA, antimony and bismuth. It is preferred that the seventh element comprises one of the elements from titanium, zirconium, hafnium, yttrium, lanthanum, cerium, praseodymium, neodymium, boron, silicon, tin, antimony, bismuth, niobium, molybdenum, tungsten, magnesium, calcium, strontium, barium, etc. Such seven-element material comprising nickel, aluminum, a third element, a forth element, a fifth element, a sixth element, and a seventh element of current invention comprises pores mainly distributed in the size range of mesopores (30.2 angstroms to 603 angstroms, or to 452 angstroms, or 362 angstroms or 259 angstroms as defined above) with negligible amounts of macropores (greater than 603 angstroms, or 452 angstroms, or 362 angstroms or 259 angstroms and up to 24,000 angstroms, as defined above). The material of seven-element system comprising aluminum, nickel, a third element, a forth element, a fifth element, a sixth element, and a seventh element of the present invention is used as a reforming catalyst. The material of the seven-element system comprising aluminum, nickel, the third element, the fourth element, the fifth element, the sixth element and the seventh element of the present invention is also used as a reforming catalyst in the molten carbonate fuel cells. The negligible presence of macropores of the seven-element catalyst comprising nickel, aluminum, a third element, a forth element, a fifth element, a sixth element, and a seventh element of the present invention is preferred to prolong the catalyst life by elimination of nickel sintering inside the macropores via unimpeded diffusion mechanism and by limiting the deposition of alkali metal hydroxide(s)/carbonate(s) on the outer shell of the catalyst pellet. The improvement in stability of the pore structure of the present invention limits the sintering of nickel metal inside the mesopores and micropores via a mechanism of impeding diffusion and the deposition of alkali metal hydroxide(s)/carbonate(s) on the outer shell of the catalyst pellet for a prolonged catalyst life.

The stability of pore structure of nickel supported on alumina comprising nickel, aluminum, a third element, a forth element, a fifth element, a sixth element, and a seventh element can be further improved by incorporating additional element(s). The additional element(s) comprises element(s) from transition metals, Group IVB, Group VB, Group VIB, Group IIIB including Lanthanum Group and Rare Earth Metal Group, Group II Alkali Earth Metals, Group IIIA, Group IVA, antimony and bismuth. It is preferred that the additional element(s) comprises one of the elements from titanium, zirconium, hafnium, yttrium, lanthanum, cerium, praseodymium, neodymium, boron, silicon, tin, antimony, bismuth, niobium, molybdenum, tungsten, magnesium, calcium, strontium, barium, etc. Such multi-element material comprising nickel, aluminum, a third element, a forth element, a fifth element, a sixth element, a seventh element, and additional element(s) of current invention comprises pores mainly distributed in the size range of mesopores (30.2 angstroms to 603 angstroms, or to 452 angstroms, or 362 angstroms or 259 angstroms as defined above) with negligible amounts of macropores (greater than 603 angstroms, or 452 angstroms, or 362 angstroms or 259 angstroms and up to 24,000 angstroms, as defined above). The material of multi-element system comprising aluminum, nickel, a third element, a forth element, a fifth element, a sixth element, a seventh element, and additional element(s) of the present invention is used as a reforming catalyst. The material of multi-element system comprising aluminum, nickel, the third element, the fourth element, the fifth element, the sixth element, the seventh element and the additional element(s) of the present invention is also used as a reforming catalyst in molten carbonate fuel cells. The negligible presence of macropores of the multi-element catalyst comprising nickel, aluminum, a third element, a forth element, a fifth element, a sixth element, a seventh element, and additional element(s) of the present invention is preferred to prolong the catalyst life by elimination of nickel sintering inside the macropores via unimpeded diffusion mechanism and by limiting the deposition of alkali metal hydroxide(s)/carbonate(s) on the outer shell of the catalyst pellet. The improvement in stability of the pore structure of the present invention limits the sintering of nickel metal inside the mesopores and micropores via a mechanism of impeding diffusion. The improvement in stability of the pore structure also limits the deposition of the alkali metal hydroxide(s)/carbonate(s) on the outer shell of the catalyst pellet. Both of these factors provide for a prolonged catalyst life.

The present invention also relates the synthesis methods of making above materials of the present invention, as shown in details in following sections.

BRIEF DESCRIPTION OF THE DRAWINGS

FIG. 1 shows Pore Size Distributions of a RefCat 2.0 catalyst that was heated at 200° C. for 2 hours in nitrogen and at 450° C. for 3 hours in air.

FIG. 2 shows Pore Size Distributions of a RefCat 3.0 catalyst that was heated at 200° C. for 2 hours in nitrogen and at 450° C. for 3 hours in air.

FIG. 3 shows Pore Size Distributions of a RefCat 4.0 catalyst that was heated at 200° C. for 2 hours in nitrogen and at 450° C. for 3 hours in air.

FIG. 4 shows Pore Size Distributions of a RefCat 5.0 catalyst that was heated at 200° C. for 2 hours in nitrogen and at 450° C. for 3 hours in air.

FIG. 5 shows Pore Size Distributions of a RefCat 6.0 catalyst that was heated at 200° C. for 2 hours in nitrogen and at 450° C. for 3 hours in air.

FIG. 6 shows Pore Size Distributions of a RefCat 7.0 catalyst that was heated at 200° C. for 2 hours in nitrogen and at 450° C. for 3 hours in air.

FIG. 7 shows Comparisons of Pore Size Distributions of RefCat 2.0, RefCat 3.0, RefCat 4.0, RefCat 5.0 and RefCat 6.0 catalysts that were heated in nitrogen for 2 hours at 200° C.

FIG. 8 shows Comparisons of Pore Size Distributions of RefCat 2.0, RefCat 3.0, RefCat 4.0, RefCat 5.0 and RefCat 6.0 catalysts that were heated in air for 3 hours at 450° C.

FIG. 9 shows a TGA-DSC Analysis of RefCat 3.0 and RefCat 7.0 catalysts (6 times DSC Signal of RefCat 7.0).

DETAILED DESCRIPTION OF THE INVENTION

Reforming catalysts are typically composed of nickel supported on alumina ($Al_2O_3$), magnesia (MgO), lithium aluminate (spinel $LiAlO_2$), or magnesium aluminate ($MgAl_2O_4$ with a spinel structure). Nickel-based reforming catalysts are usually co-precipitated with a solution of nickel and aluminum, and/or magnesium salts with a solution of sodium or potassium carbonates. The resulting precursors from these co-precipitated carbonates are filtered, washed, dried, calcined, and pelletized. Then, the pelletized catalysts are further activated by reduction with reducing agents (such as hydrogen) to produce nickel-based reforming catalysts.

For reforming catalysts with a lower nickel loading, nickel can be impregnated onto support materials such as alumina, zeolites, magnesium oxide, etc with different nickel salts. The impregnated catalysts are then calcined, pelletized, and reduced with reducing agents such as hydrogen to produce nickel-based reforming catalysts with lower nickel content.

J. C. Oudejans, P. Nootenboom, K. L. Ganguli, and C. M. Lok reported the method of preparation of nickel/alumina/silicate and its uses as catalyst in U.S. Pat. No. 4,631,265 for the catalytic hydrogenation of fish oil at a temperature of about 180° C. The hydrogenation catalyst of nickel-alumina contains significant amounts of silica, which is not desirable due to the sublimation of silicon-derivatives that are formed at high temperatures in the system of hydrocarbon reforming.

R. O. Idem and P. Kumar reported the preparation of catalysts for hydrogen production in US Patent Application, Pub. No. 2006/0216227, Sep. 28, 2006. Idem's catalyst is based on nickel supported upon a suitable mixed bi-metal oxide that is prepared using a surfactant templating method. Idem's catalyst is used as a catalyst for water-gas shift reactions and carbon dioxide reforming of hydrocarbons. Idem's catalyst contains up to 10% nickel metal and does not use alumina as a support material.

S. Wang and G. Q. (Max) Lu reported that nickel was impregnated on alumina, $CeO_2$, and $CeO_2$—$Al_2O_3$ to prepare catalysts for carbon dioxide reforming of methane in Appl. Catal. B: Environmental 19, 267-277 (1998). Wang's catalyst only uses 5% nickel supported on a support such as alumina, ceria, or ceria-alumina.

S.-E. Park, K.-W. Jun, H.-S. Roh, S.-C. Baek, Y.-S. Oh, Y.-S. Baek, R.-S. Chol, and T.-Y. Song modified θ-alumina-supported nickel reforming catalyst with alkali metals, alkali earth metals, and an element from Group IIB or lanthanide group which is used for producing synthesis gas from natural gas in U.S. Pat. No. 6,808,652, Oct. 26, 2004. Park's θ-alumina-supported nickel catalyst only contains up to 15% nickel (wt.) against θ-alumina.

Reforming catalysts prepared in the prior art usually contain both macropores and mesopores. A. Williams, G. A. Butler, and J. Hammonds (J. Catalysis 24, 1972, Page 352-

355) reported that Nickel-Alumina catalysts show two peaks (at approximately 20 angstroms and 800 angstroms) in their pore size distributions.

The macropores are not desirable because these pores allow the nickel metals to sinter to large particles under heat and hydrothermal conditions. E. Ruckenstein and B. Pulvermacher developed theories about the effect of pore size on the aging of supported metals in J. Catalysis 37, 1975, Pages 416-423. The sintering of metal particles by diffusion in the macropores is unimpeded and has a function of $S^6$, where S is the exposed surface area of metal particles per unit of the metal crystallite-support interface surface area. The particles of metals continue to grow to the size of macropores, resulted in a drastic reduction in the active surface area of metal particles. Under the same conditions, the sintering of metal particles in the mesopores and micropores by diffusion mechanism is impeded and has a function of $S^3$. The sintering of metal particles is limited to mesopores and micropores (impeded) if the pore structure of alumina support sustains its structure without collapsing. Therefore, only a limited amount of the metal particles' surface area is lost; sintering is limited by an impeded effect resulting from the presence of mesopores and micropores in the support materials. Therefore, it is highly preferred to make nickel reforming catalysts with a negligible presence of macropore structures.

A. Williams, G. A. Butler, and J. Hammonds (J. Catalysis 24, 1972, Page 352-355) reported that the presence of steam and heat reduces the number of mesopores and/or micropores of nickel-alumina reforming catalysts without reducing their average pore size. Furthermore, the presence of steam and heat increases the number of and average size of large pores (macropores). This phenomenon occurs because heat and steam can sinter the support materials, leading to a loss of surface area and the expansion of pore size in support materials. The decreased surface area in the support materials forces nickel metals to sinter by bringing small nickel particles together and transforming the nickel diffusion mechanism from an impeded sintering to an unimpeded sintering. Therefore, it is highly preferable to stabilize the pore structure of the support materials in the presence of heat and steam by utilizing unique reforming catalyst compositions.

The deposition of electrolytes such as $Li^+$, $Na^+$, $K^+$, etc. deactivates the reforming catalysts. The presence of such electrolytes accelerates the sintering of support materials. Under severe conditions, formation of lithium/sodium/potassium aluminate(s) causes pore size expansion and surface area reduction in support materials. This electrolyte-induced surface area loss and pore size expansion of the support materials can lead to accelerated sintering of the nickel particles in these reforming catalysts. It is believed that the vaporized molecules of lithium/sodium/potassium (alkali metal) carbonate(s) or hydroxide(s) collide on the surface of catalyst before they react with the catalyst support materials in molten carbonate fuel cells. The presence of macropores of the catalyst allow these alkali metal hydroxide/carbonate molecules to travel deep into the core of the catalyst pellet and react with the inner support materials. Therefore, the presence of macropores in the catalyst shortens its lifespan. Therefore, unique compositions of reforming catalysts with negligible presence of macropores have a better ability to limit the deposition and reaction of alkali metal hydroxide(s)/carbonate(s) to the outer surface of the catalyst pellet, so that the inner portion of the catalyst of the pellet is preserved for its catalytic activity until the whole pellet of catalyst is deactivated by this deactivation mechanism. It is preferred that the reforming catalysts contain mainly mesopores and micropores with a negligible presence of macropores so that the deposition of electrolytes is limited to the outer surface of the catalyst pellet, thereby prolonging the lifespan of the catalyst.

Harle et al (U.S. Pat. No. 6,043,187) discloses a hydrotreating catalyst comprised primarily of mesopores, where the mesoporous volume $V_{6nm}$-$V_{100nm}$ is at least 0.3 $cm^3$/g, the macroporous volume $V_{100nm}$ is at most 0.5 $cm^3$/g, and the microporous volume $V_{0-6nm}$ is at most 0.55 $cm^3$/g with a size in the range 6 nm to 100 nm. Whereas hydrotreatment of hydrocarbon feeds is the process through which the quantity of sulfur in the feed is reduced and in which heavy fractions are converted into lighter fractions, reforming is the process of converting hydrocarbons into syngas (as described in the background above). Furthermore, the pore size distribution disclosed in Harle et al was determined after the catalyst was used to hydrotreat two petroleum residues (Arabian Light and Boscan). The residues were passed through the catalyst at a space velocity of $0.5^{-1}$ for 2 hours with a hydrodesulfuration (HDS) conversion ranging from 58% to 68% by weight. The sulfur content of the Arabian Light and Boscan residues were 3.34% and 5.5% by weight, respectively. Hence, it is estimated that the sulfur content in the catalyst on stream ranged from 1.94% to 3.74% by weight. Although the catalyst described in Harle et al relies on the formation of metal sulfides to achieve pore size distributions that are embodied as desirable in the present invention, it cannot be utilized as a reforming catalyst; the catalyst disclosed by the present invention cannot properly function as a reforming catalyst in the presence of nontrivial amounts of sulfur (>1,000 ppm or 0.1% by weight). Hence, a skilled person would expect that the catalyst embodied in Harle et al would be unsuccessful when applied to reforming catalysis, as the manner of its creation and application necessitates the presence of large amounts of sulfur (which as stated earlier, is a poison for reforming catalysts).

Nelson et al (U.S. Pat. No. 5,545,602) discloses a hydrotreating catalyst with a specified pore size distribution. However, macropores of diameters≥1000 are claimed to be present in an amount of about 14-22% of the Total Pore Volume; this would suggest a maximum mesopore: macropore ratio of roughly 6. The large amount of macropores present in the catalyst disclosed by Nelson et al is undesirable for the present invention, as the macropores allow unimpeded nickel sintering, which reduces the functional lifespan of the reforming catalyst disclosed in the present invention.

While nickel-based reforming catalysts containing mesopores with a negligible amount of macropores are desirable for hydrocarbon reforming for the production of hydrogen fuel, there is no prior art disclosing the existence of such catalysts and the processes for making them. There is also no prior art that provides insight into the detrimental effects of macropores on the catalyst lifespan. Komodromos et al. (U.S. Pat. No. 4,185,967) and Banks et al. (U.S. Pat. No. 4,216,123 and U.S. Pat. No. 4,280,820) emphasized the importance of pore size distributions in the range of 12 to 300 angstroms which are in the range of mesopore and micropores. Sato et al. (U.S. Pat. No. 4,285,837) disclosed the importance of certain pore structure of the support material (alumina) that was used for impregnation of nickel. The pore volume given by the pores of the pore diameter ranging from 60 to 120 A for the alumina support is not less than 0.35 ml./g. and the pore volume given by the pores of the pore diameter of more than 120 A for the alumina support is not less than 0.1 ml./g. Sato et al., therefore, suggests that more pores having a pore diameter greater than 120 angstrom are favored for use in the alumina support. In addition, Sato, et al. only provide insight into the intermediate support material and do not discuss the porosity of the impregnated nickel catalyst.

Definition of "Negligible Presence (Amount) of Macropores" is provided in the Summary of the Invention described herein above and further explained in Example 7 in the Examples Section and in Table 3 described herein below.

The present invention is directed to a new method for preparing reforming catalysts of nickel supported on alumina and has led to the invention of a nickel-based reforming catalyst with unique pore size distributions. In the present invention, the precursor of nickel supported on alumina shows high BET surface areas and narrow pore size distributions (between 30 and 200 angstroms) when heated in nitrogen at 200° C. for 2 hours with negligible amounts of macropores. This type of pore size distribution is highly preferred for the improved stability of reforming catalysts because the negligible presence of macropores in the reforming catalysts leads to the elimination of unimpeded diffusion sintering among nickel particles and limits the deposition of alkali metal hydroxide(s)/carbonate(s) on the outer surface of the catalyst pellet. Because of their unique pore structure, the two element (Ni—Al) reforming catalysts of the present invention are expected to have a longer catalyst life for the processing of hydrocarbons.

Such unique and desirable pore size distributions of the reforming catalysts of nickel supported on alumina are achieved by the new synthesis methods of the present invention. The synthesis methods of catalysts comprising nickel supported on alumina of the present invention includes use of solutions of nickel salts (nitrate, chloride, sulfate, acetate, formate, other carboxylates, etc., or any combination of these salts, or solutions containing one or more than one of these salts) to precipitate with an aluminate solution (any alkali metal aluminate and/or any combination of alkali metal aluminates) that includes alkali metal (including ammonium and amine ions) carbonate(s) and/or bicarbonate(s) and alkali metal hydroxide(s) such as ammonium/amine hydroxide(s). It is preferable to use nickel salts of carboxylates such as acetate and formate. It is also preferable to use sodium aluminate, potassium aluminate, and lithium aluminate in the aluminate solution (is this correct?). Aluminum salts of nitrate, chloride, sulfate, acetate, formate, carboxylates, etc. can also be added into the solution of nickel salts either partially or completely.

In addition, calcination of the precursors of nickel supported alumina of the present invention at 450° C. for 3 hours increases its BET surface area, which is desirable for catalytic activity and stability. There was no noticeable observation of newly generated macropores due to the presence of heat, which is highly preferred in order to prevent the sintering of nickel metals via an unimpeded diffusion mechanism and to limit the deposition of alkali metal hydroxide(s)/carbonate(s) on the outer shell of the catalyst pellet when the two element reforming catalysts of the present invention are used. The two-element reforming catalyst of the present invention has a pore size distribution ranging mainly from 20 to 200 angstroms, which is highly desirable for limiting the sintering of nickel metal particles inside mesopores via impeded diffusion and for limiting the deposition of alkali metal hydroxide(s)/carbonate(s) on the outer shell of the catalyst pellet. The reforming catalyst of the present invention is expected to demonstrate a prolonged catalyst life.

Although the two element reforming catalyst of the present invention is expected to have a long catalyst life due to the presence of pores with unique pore size distributions, its mesopores still show pore size expansion from a peak of 86 angstroms at 200° C. to a peak of 107 angstroms at 450° C. due to the presence of heat, which can negatively affect the catalyst life. This invention further embodies an improvement of catalyst life by stabilizing the pore structure by introducing a third element as a dopant. Such a third element includes elements from a group of transition metals, Group IVB, Group VB, Group VIB, Group IIIB including Lanthanum Group and Rare Earth Metal Group, Group II Alkali Earth Metals, Group IIIA, Group IVA, antimony and bismuth. It is preferred to use elements such as titanium, zirconium, hafnium, yttrium, lanthanum, cerium, praseodymium, neodymium, boron, silicon, tin, antimony, bismuth, niobium, molybdenum, tungsten, magnesium, calcium, strontium, barium, etc. It is more preferred to use zirconium, titanium, cerium, yttrium, lanthanum, silicon, boron, tin, antimony, molybdenum, and other alkali earth metals. The use of zirconium as a third element in the reforming catalyst of the present invention, wherein the third element is used as a dopant, has been exemplified in Example 2 described below.

In synthesizing the three element catalyst, the third element, which is used as a dopant, was added into the solution of nickel salts and then precipitated with a solution of aluminate (alkali metals like lithium, sodium, potassium, etc.) including alkali metal (lithium, sodium, potassium, ammonium/amine, etc.) carbonate and/or bicarbonate and a base (sodium hydroxide, lithium hydroxide, potassium hydroxide, ammonium hydroxide, organic amines, etc.). With the addition of the third element into the reforming catalyst containing nickel supported on alumina, the three element reforming catalyst of the present invention shows unexpected improvements in pore structure stability under heat. Like the two element reforming catalyst embodied in the present invention, the three element reforming catalyst of the present invention has a unique pore structure that includes mesopores and negligible amounts of macropores. The negligible presence of macropores is ideal for eliminating the sintering of nickel particles via unimpeded diffusions during the usage of the reforming catalyst under heat and steaming conditions as well as for limiting the deposition of alkali metal hydroxide(s)/carbonate(s) on the outer shell of the catalyst pellet in molten carbonate fuel cells. Such elimination of the sintering of nickel particles via an unimpeded diffusion mechanism and limitation of the deposition of alkali metal hydroxide(s)/carbonate(s) on the outer shell of the catalyst pellet are expected to prolong the life of the three element reforming catalysts of the present invention.

Furthermore, the three element catalyst of the present invention has an improved pore structure stability under heat. When tested under the same conditions as the two element catalyst, the three element reforming catalyst of the present invention shifts its pore size from 64 angstroms at 200° C. to 87 angstroms at 450° C., as compared to the shift from 87 angstroms at 200° C. to 107 angstroms at 450° C. for the two element reforming catalyst of the present invention. Such improvement in pore structure stability is desirable to improve the life of the reforming catalyst by impeding the sintering of nickel particles inside smaller mesopores via the diffusion of nickel metal particles during uses under heat and hydrothermal conditions and limiting the deposition of alkali metal hydroxide(s) or carbonate(s) on the outer surface of the catalyst pellet.

Even though the three element reforming catalyst of the present invention is expected to have a prolonged catalyst life due to the presence of pores with unique pore size distributions, its mesopores still show pore size expansion from a peak of 64 angstroms at 200° C. to a peak of 87 angstroms at 450° C. due to the presence of heat, which can limit achieving an even longer catalyst life. The present invention further embodies the improvement of catalyst life by stabilizing the pore structure by introducing a fourth element as a dopant. Such fourth element include elements from a group of transition metals, Group IVB, Group VB, Group VIB, Group IIIB including Lanthanum Group and Rare Earth Metal Group, Group II Alkali Earth Metals, Group IIIA, Group IVA, antimony and bismuth. It is preferred to use elements like titanium, zirconium, hafnium, yttrium, lanthanum, cerium, praseodymium, neodymium, boron, silicon, tin, antimony, bismuth, niobium, molybdenum, tungsten, magnesium, calcium, strontium, barium, etc. It is even more preferred to use zirconium, titanium, cerium, yttrium, lanthanum, silicon, boron, tin, antimony, molybdenum, and other alkali earth metals as the fourth element. The use of cerium as the fourth element in the reforming catalyst, wherein the fourth element is used as a dopant, has been exemplified in Example 3 described below.

In synthesizing the four element catalyst, the fourth element, which is used as a dopant, along with the third element was added into the solution of nickel salts and then precipitated with a solution of aluminate (alkali metals like lithium, sodium, potassium, etc.) containing alkali metal (lithium, sodium, potassium, ammonium/amine, etc.) carbonate and/or bicarbonate and a base (sodium hydroxide, lithium hydroxide, potassium hydroxide, ammonium hydroxide, organic amines, etc.). With the addition of the third and fourth elements into the reforming catalyst containing nickel supported on alumina, the four element reforming catalyst shows unexpected improvements in pore structure stability under heat. Like the two element and three element reforming catalysts embodied in this invention, the four element reforming catalyst of the present invention has a unique pore structure that includes mesopores with negligible amounts of macropores. The negligible presence of macropores is ideal for eliminating the sintering of nickel metal via unimpeded diffusions during the usage of the reforming catalyst under heat and steaming conditions as well as for limiting the deposition of alkali metal hydroxide(s)/carbonate(s) on the outer shell of the catalyst pellet. Such elimination of the sintering of nickel metal via an unimpeded diffusion mechanism and limitation of the deposition of alkali metal hydroxide(s)/carbonate(s) on the outer shell of the catalyst pellet are expected to prolong the life of the four element reforming catalysts of the present invention.

Furthermore, the four element catalyst of the current invention has an improved pore structure stability under heat. When tested under the same conditions as the two and three element catalysts, the invented four element reforming catalyst shifts its pore size from 65 angstroms at 200° C. to 79 angstroms at 450° C., as compared to the shift from 87 angstroms to 107 angstroms for the two element reforming catalyst of the present invention and the shift from 64 angstroms at 200° C. to 87 angstroms at 450° C. for the three element reforming catalyst of the present invention. Such improvement in pore structure stability is desirable to improve the life of the reforming catalyst by impeding the sintering of nickel particles inside the mesopores via diffusion of nickel particles during uses under heat and hydrothermal conditions, as well as by limiting the deposition of alkali metal hydroxide(s)/carbonate(s) on the outer surface of the catalyst pellet.

Even though the four element reforming catalyst of the present invention is expected to have a prolonged catalyst life due to the presence of pores with unique pore size distributions, its mesopores still show pore size expansion from a peak of 65 angstroms at 200° C. to a peak of 79 angstroms at 450° C. due to the presence of heat, which is not as desirable for achieving an even longer catalyst life. The present invention further embodies the improvement of catalyst life by stabilizing the pore structure by introducing a fifth element as a dopant. Such fifth element include elements from transition metals, Group IVB, Group VB, Group VIB, Group IIIB including Lanthanum Group and Rare Earth Metal Group, Group II Alkali Earth Metals, Group IIIA, Group IVA, antimony and bismuth. It is more preferred to use elements like titanium, zirconium, hafnium, yttrium, lanthanum, cerium, praseodymium, neodymium, boron, silicon, tin, antimony, bismuth, niobium, molybdenum, tungsten, magnesium, calcium, strontium, barium, etc. It is even more preferred to use zirconium, titanium, cerium, yttrium, lanthanum, silicon, boron, tin, antimony, molybdenum, and other alkali earth metals. The usage of a small amount of silicon as a fifth element in the reforming catalyst as a dopant has been exemplified in the present invention.

It is further embodied that the fifth element as a dopant along with the third element and the forth element was added into the solution of nickel salts and then precipitated with a solution of aluminate (alkali metals like lithium, sodium, potassium, etc.) containing alkali metal (lithium, sodium, potassium, ammonium/amine, etc.) carbonate and/or bicarbonate and a base (sodium hydroxide, lithium hydroxide, potassium hydroxide, ammonium hydroxide, organic amines, etc.). With addition of the third, forth and fifth elements into the reforming catalyst containing nickel supported on alumina, the five element reforming catalyst shows unexpected improvements in pore structure stability under heat. Like the two element, three element, and four element reforming catalysts embodied in this invention, the five element reforming catalyst of the present invention has unique pore structure of the presence of mesopores with negligible amounts of macropores. The negligible presence of macropores is ideal for eliminating the sintering of nickel metal via unimpeded diffusions during the usage of the reforming catalyst under heat and steaming conditions as well as limiting the deposition of alkali metal hydroxide(s)/carbonate(s) to the outer shell of the catalyst pellet. Such elimination of the sintering of nickel metal via an unimpeded diffusion mechanism and limitation of the deposition of alkali metal hydroxide(s)/carbonate(s) to the outer shell of the catalyst pellet are expected to prolong the life of the four element reforming catalysts of the present invention.

Furthermore, the five element catalyst of the current invention embodies its improvement in the pore structure stability under heat. Under the same conditions, the invented five element reforming catalyst shift its pore size from 56 angstroms at 200° C. to 67 angstroms at 450° C., as compared to the shift from 87 angstroms at 200° C. to 107 angstroms at 450° C. for the two element reforming catalyst of the present invention, the shift from 64 angstroms at 200° C. to 87 angstroms at 450° C. for the three element reforming catalyst of the present invention, and the shift from 65 angstroms at 200° C. to 79 angstroms at 450° C. for the four element reforming catalyst of the present invention. Such improvement in pore structure stability is desirable to improve the life of the reforming catalyst by impeding the sintering of nickel particles inside mesopore via diffusion of nickel particles during uses under heat and hydrothermal conditions, as well as by limiting the deposition of alkali metal hydroxide(s)/carbonate(s) on the outer surface of the catalyst pellet.

Even though the five element reforming catalyst of the present invention is expected to have a prolonged catalyst life due to the presence of pores with unique pore size distributions, its mesopores still show pore size expansion from a peak of 56 angstroms at 200° C. to a peak of 67 angstroms at 450° C. due to the presence of heat, which is not as desirable for achieving an even longer catalyst life. The present invention further embodies the improvement of catalyst life by stabilizing the pore structure by introducing a sixth element as a dopant. Such sixth element include elements from transition metals, Group IVB, Group VB, Group VIB, Group IIIB including Lanthanum Group and Rare Earth Metal Group, Group II Alkali Earth Metals, Group IIIA, Group IVA, antimony and bismuth. It is more preferred to use elements like titanium, zirconium, hafnium, yttrium, lanthanum, cerium, praseodymium, neodymium, boron, silicon, tin, antimony, bismuth, niobium, molybdenum, tungsten, magnesium, calcium, strontium, barium, etc. It is even more preferred to use zirconium, titanium, cerium, yttrium, lanthanum, silicon, boron, tin, antimony, molybdenum, and other alkali earth metals. The usage of praseodymium and neodymium as a fifth and sixth elements, respectively, in the reforming catalyst as dopants has been exemplified in the present invention.

It is further embodied that the sixth element as a dopant along with the third element, the forth element, and the fifth element was added into the solution of nickel salts and then precipitated with a solution of aluminate (alkali metals like lithium, sodium, potassium, etc.) containing alkali metal (lithium, sodium, potassium, ammonium/amine, etc.) carbonate and/or bicarbonate and a base (sodium hydroxide, lithium hydroxide, potassium hydroxide, ammonium hydroxide, organic amines, etc.). With addition of the third, forth, fifth, and sixth elements into the reforming catalyst containing nickel supported on alumina, the six element reforming catalyst shows unexpected improvements in pore structure stability under heat. Like the two element, three element, four element, and five element reforming catalysts embodied in this invention, the six element reforming catalyst of the present invention has unique pore structure of the presence of mesopores with negligible amounts of macropores. The negligible presence of macropores is ideal for eliminating the sintering of nickel metal via unimpeded diffusions during the usage of the reforming catalyst under heat and steaming conditions as well as limiting the deposition of alkali metal hydroxide(s)/carbonate(s) on the outer shell of the catalyst pellet. Such elimination of the sintering of nickel metal via an unimpeded diffusion mechanism and limitation of the deposition of alkali metal hydroxide(s)/carbonate(s) on the outer shell of the catalyst pellet are expected to prolong the life of the four element reforming catalysts of the present invention.

Furthermore, the six element catalyst of the current invention embodies its improvement in the pore structure stability under heat. Under the same conditions, the invented six element reforming catalyst shift its pore size from 49 angstroms at 200° C. to 63 angstroms at 450° C., as compared to the shift from 87 angstroms at 200° C. to 107 angstroms at 450° C. for the two element reforming catalyst of the present invention, the shift from 64 angstroms at 200° C. to 87 angstroms at 450° C. for the three element reforming catalyst of the present invention, the shift from 65 angstroms at 200° C. to 79 angstroms at 450° C. for the four element reforming catalyst of the present invention, and the shift from 56 angstroms at 200° C. to 67 angstroms at 450° C. for the four element reforming catalyst of the present invention. Such improvement in pore structure stability is desirable to improve the life of the reforming catalyst by impeding the sintering of nickel particles inside mesopores via diffusion of nickel particles during uses under heat and hydrothermal conditions, as well as by limiting the deposition of alkali metal hydroxide(s)/carbonate(s) on the outer surface of the catalyst pellet.

Although the six element reforming catalyst of the present invention is expected to have a prolonged catalyst life due to the presence of pores with unique pore size distributions, its mesopores still shows pore size expansion from a peak of 49 angstroms at 200° C. to a peak of 63 angstroms at 450° C. due to the presence of heat, which is not desirable for achieving an even longer catalyst life. The present invention further embodies the improvement of catalyst life by stabilizing the pore structure by introducing seventh element as dopant. Such seventh element include elements from transition metals, Group IVB, Group VB, Group VIB, Group IIIB including Lanthanum Group and Rare Earth Metal Group, Group II Alkali Earth Metals, Group IIIA, Group IIIA, Group IVA, antimony and bismuth. It is more preferred to use elements like titanium, zirconium, hafnium, yttrium, lanthanum, cerium, praseodymium, neodymium, boron, silicon, tin, antimony, bismuth, niobium, molybdenum, tungsten, magnesium, calcium, strontium, barium, etc. It is even more preferred to use zirconium, titanium, cerium, yttrium, lanthanum, silicon, boron, tin, antimony, molybdenum, and other alkali earth metals. The usage of strontium, barium, and titanium (the fifth element, the sixth element, and the seventh element, respectively) as dopants along with zirconium, cerium, aluminum, and nickel has been exemplified in this invention.

It is further embodied that the seventh element as dopant along with the third, forth, fifth, and sixth elements were added into the solution of nickel salts and then precipitated with a solution of aluminate (alkali metals like lithium, sodium, potassium, etc.) containing alkali metal (lithium, sodium, potassium, ammonium/amine, etc.) carbonate and/or bicarbonate and a base (sodium hydroxide, lithium hydroxide, potassium hydroxide, ammonium hydroxide, organic amines, etc.). With addition of the seventh element into the invented reforming catalyst containing nickel supported on alumina, the seven element reforming catalyst of the present invention shows unexpected improvements in pore structure stability under heat. Like the two element, three element, four element, five element, and six element reforming catalysts embodied in the present invention, the seven element reforming catalyst of the present invention has unique pore structures of the presence of mesopores with negligible amounts of macropores. The negligible presence of macropores is ideal for eliminating the sintering of nickel particles via unimpeded diffusions during the usage of the reforming catalyst under heat and steaming conditions as well as limiting the deposition of alkali metal hydroxide(s)/carbonate(s) on the outer shell of the catalyst pellet. Such elimination of the sintering of nickel particles via unimpeded diffusion mechanism and limitation of the deposition of alkali metal hydroxide(s)/carbonate(s) on the outer shell of the catalyst pellet are expected to prolong the life of the seven element reforming catalysts of the present invention.

Furthermore, the seven element catalyst of the present invention embodied its improvement in the pore structure stability under heat. Under the same conditions, the seven element reforming catalyst of the present invention shows little shift of its pore size from 62 angstroms at 200° C. to 65 angstroms at 450° C., as compared to the shift from 87 angstroms at 200° C. to 107 angstroms at 450° C. for two element reforming catalyst of the present invention, the shift from 64 angstroms at 200° C. to 87 angstroms at 450° C. for the three element reforming catalyst of the present invention, the shift from 59 angstroms at 200° C. to 84 angstroms at 450° C. for the four element reforming catalyst of the present invention, the shift from 56 angstroms at 200° C. to 67 angstroms at 450° C. for the five element reforming catalyst of the present invention, and the shift from 49 angstroms at 200° C. to 63 angstroms at 450° C. for the six element reforming catalyst of the present invention. Such drastic improvement in pore structure stability is highly desirable to improve the life of the reforming catalyst by impeding the sintering of nickel particles inside the mesopores via diffusion of nickel metal during uses under heat and hydrothermal conditions, as well as the deposition of alkali metal hydroxide(s)/carbonate(s) on the outer surface of the catalyst pellet.

Further improvements in the catalyst life can be further embodied by stabilizing the pore structure by introducing additional element(s) as dopants beyond the seven element system. Such additional element(s) may include elements from transition metals, Group IVB, Group VB, Group VIB, Group IIIB including Lanthanum Group and Rare Earth Metal Group, Group II Alkali Earth Metals, Group IIIA, Group IIIA, Group IVA, antimony and bismuth.

The present invention also embodies that the dopant(s) in the reforming catalysts of nickel supported on alumina of the present invention play important roles not only in stabilizing the pore structure of the reforming catalysts for minimizing the sintering of the nickel metals, but also in stabilizing the support materials (alumina). The stabilization of support materials, particularly, may be more critical when alkali metal electrolytes are deposited on reforming catalysts, occurred in the molten carbonate fuel cells. The alkali metal electrolyte ions can react with alumina at high temperature to form aluminate materials which lead to the pore structure collapse of the support materials, obviously resulting in the deactivation of the reforming catalysts. Therefore, the dopant(s) in this invention help slow down the formation of aluminate and/or hold the pore structure of the support by themselves even after the collapse of alumina support materials.

Additional dopant(s) beyond the disclosure in these reforming catalysts of the present invention are within the scope of this invention and are also expected to achieve equivalent or better stability of pore structures so that the reforming catalyst life can be further extended. The disclosure of the present invention may not present the optimized performances of the reforming catalysts. Anybody with the skills in the art can further optimize the system. Any further optimization of reforming catalyst system of the present invention is still within the scope of the present invention.

The reforming catalysts of the present invention with unique pore structures and unique chemical compositions can be used in steam reforming of hydrocarbons, partial oxidative reforming of hydrocarbons, carbon dioxide reforming of hydrocarbons, and other uses. The reforming catalysts of the present invention with unique pore structures and unique chemical compositions can also be used in steam reforming of hydrocarbons, partial oxidative reforming of hydrocarbons, carbon dioxide reforming of hydrocarbons for production of hydrogen fuel for molten carbonate fuel cells.

The reforming catalysts of the present invention can be further doped with other active components such as cobalt, copper, ruthenium, precious metals, and other active materials.

The reforming catalysts of the present invention can be doped with alkali metals (or alkali metal compounds) for controlling the coke formation (or carbon deposit) in other catalytic systems.

The reforming catalysts of the present invention can be prepared by precipitation, impregnation, solid state reactions, chemical vapor deposition, physical vapor deposition, and other preparation methods.

Different filtration methods, washing methods, drying methods, calcinations methods, pelletizing methods, reducing methods, and other methods can be used to prepare the reforming catalysts of the present invention.

The catalysts of the present invention can be further processed, modified or altered by post-synthesis processes such as milling, pulverizing, compacting, pelletizing, calcining, steaming, reducing, oxidizing, doping, etc. Any post-processing of the materials of the present invention is still within the scope of the present invention.

An illustrative method of preparing the catalysts of the present inventions will now be described. In preparing the catalysts of the present invention, a first solution comprising one or more nickel salts is provided in the first step S1. The first solution is either a solution or a dispersion and includes one or more of a nickel salt of acetate, formate, carboxylate, nitrate, sulfate, chrloride, carbonate and halide. For example, in the specific examples described herein below, nickel carbonate is used as the nickel salt in the first solution. The nickel salt may be dissolved or dispersed in water or any other suitable solvent. In addition, an acid, such as acetic acid may be added to the nickel salt solution.

In the next step S2, a second solution comprising at least one of aluminate, carbonate, bicarbonate and a base is provided. More particularly, the second solution includes an alkali metal aluminate, a carbonate or a bicarbonate which includes one or more of an alkali metal carbonate, alkali metal bicarbonate, ammonium carbonate, ammonium bicarbonate, organic ammine carbonate and organic amine bicarbonate, and a base that comprises one or more of alkali metal hydroxide, alkali metal oxide, ammonium hydroxide and organic ammine hydroxide. The alkali metals used in the components of the second solution include lithium, sodium and potassium. In the specific examples described below, the second solution includes sodium aluminate as the alkali metal aluminate, sodium bicarbonate or baking soda ($NaHCO_3$) as the bicarbonate, and caustic soda or sodium hydroxide (NaOH) as the base. In these examples, the second solution is prepared by adding sodium bicarbonate or baking soda ($NaHCO_3$) to water, adding sodium hydroxide (NaOH) to the baking soda solution, and thereafter mixing in a sodium aluminate solution.

As described herein above, in some embodiments the catalyst is a two-element catalyst, while in other embodiments at least one of a third, fourth, fifth, sixth, seventh and additional elements are added as dopants to the catalyst. In preparing the two-element catalyst, the method proceeds to step S3 in which the first solution is reacted with the second solution. As described in Example 1 below, in some embodiments, the first solution is dripped into the second solution so as to precipitate a slurry. The pH of the resulting precipitate may be adjusted using an acid, such as acetic acid, or a base, such sodium hydroxide.

In the next step S4, the precipitate is aged in an oven and thereafter washed in step S5. In the specific examples described below, the aging of the precipitate in step S4 is performed by placing the precipitate into an oven at a temperature between 85° C. and 90° C. for about 20 hours. However, it is understood that the temperatures and the length of time for aging the slurry may vary. Also, in the specific examples provided below, the slurry is washed in step S5 using water, which can be either tap water or distilled water, by diluting the slurry in water and decanting the solution so as to remove unwanted salts. The washing procedure is repeated a number of times so as to obtain a catalyst precipitate substantially without the unwanted salts. The washing can also be carried out by filtration.

Finally, the washed precipitate of the two-element catalyst is heated and dried in an oven in step S6. In the examples described below, the precipitate is heated at 120° C. for 24 hours. However, the temperature and length of time for heating the catalyst precipitate may vary depending on the materials used in forming the precipitate.

In preparing the multi-element catalysts having at least one of a third, fourth, fifth, sixth, seventh and additional elements (referred to as "dopant elements"), the method includes an additional step S2A of providing a precursor of each element being added as a dopant (dopant element) and a further step S2B of combining the first solution with the precursors provided in step S2A so as to form a third solution.

In step 2A, the precursor for each dopant element can be one of a salt of the dopant element, a hydroxide of the dopant element and an oxide of the dopant element. In particular, the precursor of each dopant element is one or more of a dispersion of a hydroxide of the dopant element, a dispersion of an oxide of the dopant element and a salt of the dopant element, which comprises one or more of a salt of acetate, formate, carboxylate, nitrate, sulfate, chloride, halide, oxalate and carbonate. The precursor of the dopant element can be either in a solution form or in solid or crystal form. For example, in forming the three-element catalyst described above, a precursor of the third element is provided in step S2A, wherein the precursor of the third element is one of salt of the third element, a hydroxide of the third element and an oxide of the third element. In Example 2 described below, the precursor of the third element provided in step S2A and added to the first solution in step S2B is a solution that is formed by adding ammonium zirconium carbonate to a mixture of acetic acid and water. In another Example 3 described below, which describes illustrative preparation of a four-element catalyst, a precursor of the third element and a precursor of the fourth element are provided in step S2A and added to the first solution in step S2B. In this example, the precursor of the third element is similar to the precursor used in Example 2, and the precursor of the fourth element comprises cerium nitrate crystals.

The third solution, formed in step S2B and which includes the dopant elements of the multi-element catalyst, is then reacted with the second solution to form a precipitate in step S3. The aging, washing and heating steps S4-S6 of preparing the multi-element catalysts are similar to those described above with respect to the two-element catalyst.

The present invention is further embodied in the following examples, but the scope of the present invention is not limited to these examples:

EXAMPLES

Example 1

RefCat 2.0 Containing Ni and Al

The nickel carbonate powders containing 46% Ni (15.2 g) were dispersed in 148 grams of water under stirring conditions in a 400 mL beaker. Then, 16.3 grams of acetic acid were added into the nickel carbonate slurry. The slurry was then heated to dissolve nickel carbonate, evolving carbon dioxide gas until the solution of nickel acetate became clear. The obtained nickel acetate solution was cooled down to room temperature and became Solution I.

Subsequently, 5.5 grams of baking soda ($NaHCO_3$) powder were weighed into a 1000 mL beaker. Then, 359 grams of water were added into this 1000 mL beaker. Under mixing conditions, 16.5 grams of caustic soda (50% NaOH) were then added into the baking soda solution. Next, 14.99 grams of sodium aluminate solution (20.2% alumina), SAX-19 from Kemira, were added into the above 1000 mL beaker containing a solution of $NaHCO_3$ and NaOH, under mixing conditions. The resulting solution became Solution II.

Under stirring conditions, Solution I was dripped into Solution II with a pipette in nine minutes. The pH of the precipitated slurry was measured to be 10.55. The pH was then adjusted to 9.98 with acetic acid. Then, the precipitated slurry was placed into an oven for aging at a temperature between 85° C. to 90° C. for about 20 hours. The aged slurry was then taken out of the oven and diluted with water to a half gallon and then mixed. The slurry was then settled for about eight hours. The clear solution containing unwanted salts was then decanted. Subsequently, the slurry was further diluted to a half of gallon with water under mixing conditions. This washing with diluting and decanting procedure was repeated ten times. Then, the slurry was placed into an oven at 120° C. for 24 hours and 17.6 grams of RefCat 2.0 were recovered.

Example 2

RefCat 3.0 Containing Ni, Al, and Zr

The nickel carbonate powders containing 46% Ni (14.06 g) were dispersed in 138 grams of water under stirring conditions in a 400 mL beaker. Then, 15.2 grams of acetic acid were added into the nickel carbonate slurry. The slurry was then heated to dissolve nickel carbonate, evolving carbon dioxide gas until the solution of nickel acetate became clear. The obtained nickel acetate solution was cooled down to room temperatures and became Solution I.

In a 100 mL beaker, 2.8 grams of acetic acid were mixed into 9.6 grams water under mixing conditions. Then, 4.7 grams of ammonium zirconium carbonate (20% zirconia) were dripped into the acetic solution under mixing. It was observed that carbon dioxide gas evolved out of the solution. After the reactions were complete, the pH of the solution containing zirconium was measured to be about 5.0. This clear solution containing zirconium was then dripped into Solution I under mixing conditions. The clear solution containing both nickel and zirconium became Solution II.

Then, 5.0 grams of baking soda ($NaHCO_3$) powder were weighed into a 1000 mL beaker. Subsequently, 359 grams of water were added into this 1000 mL beaker. Under mixing conditions, 16.3 grams of caustic soda (50% NaOH) were then added into the baking soda solution. Then, 11.63 grams of sodium aluminate solution (20.2% alumina), SAX-19 from Kemira, were added into the above 1000 mL beaker containing a solution of $NaHCO_3$ and NaOH, under mixing conditions. The resultant solution became Solution III.

Under stirring conditions, Solution II was dripped into Solution III with a pipette in fourteen minutes. The pH of precipitated slurry was measured to be 8.98. Then, the precipitated slurry was placed into an oven for aging at a temperature between 85° C. to 90° C. for about 21 hours. The aged slurry was then taken out of the oven and diluted with water to a half gallon and then mixed. The slurry was then settled for eight hours. The clear solution containing unwanted salts was then decanted. Then, the slurry was further diluted to a half of gallon with water and then mixed. Such washing with diluting and decanting procedures was repeated eight times. Then the slurry was placed in an oven at 120° C. for 24 hours and 16.5 grams of RefCat 3.0 were recovered.

Example 3

RefCat 4.0 Containing Ni, Al, Zr, and Ce

The powders of nickel carbonate containing 46% Ni (13.75 g) were dispersed in 134.6 grams of water under stirring conditions in a 400 mL beaker. Then 15.0 grams of acetic acid were added into the nickel carbonate slurry. The slurry was then heated to dissolve nickel carbonate, evolving carbon dioxide until the solution of nickel acetate became clear. The obtained nickel acetate solution was cooled down to room temperatures and became Solution I.

In a 100 mL beaker, 2.9 grams of acetic acid was mixed with 9.5 grams of water under mixing conditions. Then, 4.6 grams of ammonium zirconium carbonate (20% IRCONIA) was dripped into the acetic solution under mixing. It was observed that carbon dioxide gas evolved out the solution. After the reactions were complete, the pH of the solution containing zirconium was measured to be about 5.0. This clear solution containing zirconium was then dripped into Solution I under mixing. The clear solution containing both of nickel and zirconium became Solution II.

Into the Solution II, 1.2 grams of cerium nitrate crystals (39.42% CeO2) was then added into Solution II. With mixing, the dissolved and clear solution contains nickel, zirconium, and cerium and became Solution III Then, 5.0 grams of baking soda ($NaHCO_3$) powder were weighed into a 1000 mL beaker. Subsequently, 352 grams of water were added into this 1000 mL beaker. Under mixing conditions, 16.8 grams of caustic soda (50% NaOH) were then added into the baking soda solution. Then, 10.88 grams of sodium aluminate solution (20.2% alumina), SAX-19 from Kemira, were added into the above 1000 mL beaker containing a solution of $NaHCO_3$ and NaOH, under mixing conditions. The resultant solution became Solution IV.

Under stirring conditions, Solution III was dripped into Solution IV with a pipette in twelve minutes. Then, the precipitated slurry was placed into an oven for aging at a temperature between 85° C. to 90° C. for about 20 hours. The aged slurry was then taken out of the oven and diluted with water to a half gallon and then mixed. The pH of precipitated slurry was measured to be 9.26. The slurry was then settled for eight hours. The clear solution containing unwanted salts was then decanted. Then, the slurry was further diluted to a half of gallon with water and then mixed. Such washing with diluting and decanting procedures was repeated ten times. The recovered slurry was placed in an oven at 125° C. for 24 hours for drying and 16.4 grams of RefCat 4.0 were recovered.

Example 4

RefCat 5.0 Containing Ni, Al, Zr, Ce, and Si

The powders of nickel carbonate containing 46% Ni (13.75 g) were dispersed in 134.7 grams of water under stirring conditions in a 400 mL beaker. Then 15.0 grams of acetic acid were added into the nickel carbonate slurry. The slurry was then heated to dissolve nickel carbonate, evolving carbon dioxide until the solution of nickel acetate became clear. The obtained nickel acetate solution was cooled down to room temperatures and became Solution I.

In a 100 mL beaker, 2.9 grams of acetic acid was mixed 9.5 grams of water under mixing conditions. Then, 4.6 grams of ammonium zirconium carbonate (20% IRCONIA) was dripped into the acetic solution under mixing. It was observed that carbon dioxide gas evolved out the solution. After the reactions were complete, the pH of the solution containing zirconium was measured to be about 5.0. This clear solution containing zirconium was then dripped into Solution I under mixing. The clear solution containing both of nickel and zirconium became Solution II.

Into the Solution II, 1.2 grams of cerium nitrate crystals (39.42% $CeO_2$) was then added into Solution II. With mixing, the dissolved and clear solution contains nickel, zirconium, and cerium and became Solution III In a 100 mL beaker, about 40 mL water was mixed with 0.8 grams potassium silicate (20% silica). Then, 0.7 grams of acetic acid were added into the silicate solution fast. A clear solution of silica was then obtained with a pH of 3.98. Such silica solution was dripped into the Solution III to prepare Solution IV containing Ni, Zr, Ce, and Si.

Then, 5.0 grams of baking soda ($NaHCO_3$) powder were weighed into a 1000 mL beaker. Subsequently, 352 grams of water were added into this 1000 mL beaker. Under mixing conditions, 16.8 grams of caustic soda (50% NaOH) were then added into the baking soda solution. Then, 10.88 grams of sodium aluminate solution (20.2% alumina), SAX-19 from Kemira, were added into the above 1000 mL beaker containing a solution of $NaHCO_3$ and NaOH, under mixing conditions. The resultant solution became Solution V.

Under stirring conditions, Solution IV was dripped into Solution V with a pipette in fifteen minutes. Then, the precipitated slurry was placed into an oven for aging at a temperature between 85° C. to 90° C. for about 16 hours. The aged slurry was then taken out of the oven and diluted with water to a half gallon and then mixed. The slurry was then settled for eight hours. The clear solution containing unwanted salts was then decanted. Then, the slurry was further diluted to a half of gallon with water and then mixed. Such washing with diluting and decanting procedures was repeated ten times. The recovered slurry was placed in an oven at 125° C. for 24 hours for drying and 16.4 grams of RefCat 5.0 were recovered.

Example 5

RefCat 6.0 Containing Ni, Al, Zr, Ce, Pr, and Nd

The powders of nickel carbonate containing 46% Ni (13.47 g) were dispersed in 132 grams of water under stirring conditions in a 400 mL beaker. Then 14.75 grams of acetic acid were added into the nickel carbonate slurry. The slurry was then heated to dissolve nickel carbonate, evolving carbon dioxide until the solution of nickel acetate became clear. The obtained nickel acetate solution was cooled down to room temperatures and became Solution I.

In a 100 mL beaker, 0.233 grams of praseodymium carbonate (46.7% Pr) and 0.228 grams of neodymium carbonate (47.8% Nd) was trying to be dispersed in 5.0 grams of water. Then, 0.28 grams of acetic acid was used to dissolve the carbonate salts under heating conditions. However, uses of 300% amounts of acetic acid did not lead to a complete dissolution of the carbonate salts. Eventually, a diluted mixture containing both of acetic acid and nitric acid was used to adjust the pH from 3.78 to 3.3 to 3.4 microns at a very low concentration. Then the solution was clarified. Such clear solution was then added into Solution I to become Solution II.

In a 100 mL beaker, 2.77 grams of acetic acid was mixed 9.5 grams of water under mixing conditions. Then, 4.51 grams of ammonium zirconium carbonate (20% IRCONIA) was dripped into the acetic solution under mixing. It was observed that carbon dioxide gas evolved out the solution. After the reactions were complete, the pH of the solution containing zirconium was measured to be about 5.0. This clear solution containing zirconium was then dripped into Solution II under mixing. The clear solution containing both of nickel, zirconium, praseodymium, neodymium became Solution III.

Into the Solution III, 1.1 grams of cerium nitrate crystals (39.42% $CeO_2$) was then added into Solution III. With mixing, the dissolved and clear solution contains nickel, zirconium, cerium, praseodymium, and neodymium became Solution IV Then, 5.07 grams of baking soda ($NaHCO_3$) powder were weighed into a 1000 mL beaker. Subsequently, 352 grams of water were added into this 1000 mL beaker. Under mixing conditions, 16.8 grams of caustic soda (50% NaOH) were then added into the baking soda solution. Then, 11.14 grams of sodium aluminate solution (20.2% alumina), SAX-19 from Kemira, were added into the above 1000 mL beaker containing a solution of $NaHCO_3$ and NaOH, under mixing conditions. The resultant solution became Solution V.

Under stirring conditions, Solution IV was dripped into Solution V with a pipette in seventeen minutes with a final pH of 8.34, which was then adjusted to 9.26 with NaOH. Then, the precipitated slurry was placed into an oven for aging at a temperature between 85° C. to 90° C. for about 19 hours. The aged slurry was then taken out of the oven and diluted with water to a half gallon and then mixed. The slurry was then settled for eight hours. The clear solution containing unwanted salts was then decanted. Then, the slurry was further diluted to a half of gallon with water and then mixed. Such washing with diluting and decanting procedures was repeated ten times. The recovered slurry was placed in an oven at 125° C. for 24 hours for drying and 16.3 grams of RefCat 6.0 were recovered.

Example 6

RefCat 7.0 Containing Ni, Al, Zr, Ce, Ba, Sr, and Ti

With procedures similar to Example 3 for preparing RefCat 4.0, RefCat 7.0 was prepared with three more additional elements (Ba, Sr, and Ti) by using raw materials of barium hydroxide, strontium carbonate, and titanium oxide. Nickel carbonate, sodium aluminate, ammonium zirconium carbonate, and cerium nitrate were used as raw materials for the sources of nickel, aluminum, zirconium, and cerium, respectively.

Under stirring conditions, solutions containing nickel, zirconium, cerium, barium, strontium, and titanium were dripped into a solution containing sodium aluminate, sodium bicarbonate, and sodium hydroxide to precipitate out the precursor of the reforming catalyst. Then the precipitated slurry was placed in an oven for aging at a temperature between 85° C. to 90° C. for about 24 hours. The pH of aged slurry was measured to be 9.53. The aged slurry was then diluted with water to about 3.5 liters with mixing. This diluted slurry was then settled for about twelve hours. The clear solution containing unwanted salts was then decanted. Then the slurry was further diluted to about 3.5 liters with water and then mixed. Such washing with diluting, settling, and decanting procedures was repeated six times. The recovered slurry was placed in an oven at 125° C. for 24 hours for drying and 22.3 grams of RefCat 7.0 were recovered.

Example 7

Mercury Porosimetry

The pore size distributions of catalytic materials were determined by a mercury porosimetry instrument manufactured by Micromeritics, Model AutoPore IV. The pore size distributions were done by the protrusion of mercury under an applied pressure of up to 60,000 psi. The pore size distributions and other parameters were then calculated based on the curve of mercury protrusion volume vs. the applied pressure.

Samples of RefCat 2.0, RefCat 3.0, RefCat 4.0, RefCat 5.0, RefCat 6.0, and RefCat 7.0 were heated at 200° C. for 2 hours under a flow of nitrogen. The pore size distributions were then determined by mercury porosimetry. Samples of RefCat 2.0, RefCat 3.0, RefCat 4.0, RefCat 5.0, RefCat 6.0, and RefCat 7.0 were heated to 450° C. in a furnace for 3 hours separately and analyzed by mercury porosimetry. The results of pore size distribution measurements are plotted in FIG. 1, FIG. 2, FIG. 3, FIG. 4, FIG. 5, and FIG. 6. The other mercury porosimetry data are shown in Table 1, Table 2, and Table 3. In addition, comparisons of the pore size distribution of these samples are plotted in FIG. 7 and FIG. 8.

The synthesis methods of the present invention lead to unique pore structures for the precursor of the two element reforming catalyst RefCat 2.0 containing aluminum and nickel, as shown in FIG. 1. After heating at 200° C. for 2 hours under a flow of nitrogen, there was negligible amount of macropores detected. Pores that were found have been mainly distributed between 20 angstroms and 400 angstroms with a pore volume of 0.3378 mL/g. The average pore size of the two-element catalyst is located at 86 angstroms. Based on theory of E. Ruckenstein and B. Pulvermacher, the negligible presence of macropores of the reforming catalyst eliminates the sintering of nickel particles via an unimpeded diffusion mechanism during its usage under heat and steam conditions. This is highly desirable, as the sintering of nickel particles in macropores leads to a drastic reduction in the surface area of nickel metal.

More importantly, heating the two-element reforming catalyst of the present invention, RefCat, at 450° C. for 3 hours in air did not lead to any further formation of macropores, also shown in FIG. 1. Pores of this heated two-element reforming catalyst are mainly distributed between 30 angstroms and 400 angstroms, more mainly distributed between 30 angstroms and 300 angstroms, and most mainly distributed between 40 angstroms and 200 angstroms. The average pore size was calculated to be 107 angstroms. The narrow pore size distributions of the reforming catalyst of the present invention are very unique as compared to the prior art, for the reforming catalysts that are composed of nickel supported on alumina (a two-element system). Based on theory, this unique pore structure of the two-element reforming catalyst will have a longer catalyst life due to the elimination of nickel sintering via an unimpeded diffusion mechanism during its usage as well as limiting the deposition of alkali metal hydroxide(s)/carbonate(s) on the outer surface of the catalyst pellet.

Even though the newly invented synthesis methods result in a unique pore structure of the two-element reforming catalyst that facilitates prolonged catalyst life, there was a shift in the pore sizes to larger pores due to an increase in calcination temperature from 200° C. to 450° C. The average pore size shifted from 86 angstroms to 107 angstroms. An increase in pore size might not be desirable for prolonging the catalyst life because the large pores has less impeding effects on nickel sintering via diffusion inside larger pores.

New compositions have been found in the present invention to slow down the pore size expansion of reforming catalyst by incorporating a third element. Such a third element is exemplified by precipitating the two-element reforming catalysts of nickel-supported alumina with incorporation of zirconium.

As shown in FIG. 2, the precursor of the three element reforming catalyst of the present invention, RefCat 3.0, also possesses a unique pore structure. After heating at 200° C. for 2 hours under a flow of nitrogen, there was negligible amount of macropores detected. Pores that were found have been mainly distributed between 30 angstroms and 200 angstroms (with some pores seeming to be smaller than mercury porosimetry instrument can detect) with a pore volume of 0.3464 mL/g. The average pore size of the three-element catalyst is located at 64 angstroms. The narrow pore size distributions of the reforming catalyst of the present invention are very unique, as compared to the prior art, for the reforming catalysts that are composed nickel-supported on alumina by incorporating a third element (a three-element system). Based on theory, such unique pore structure of the three-element reforming catalyst will have a even longer catalyst life due to the elimination of nickel sintering via an unimpeded diffusion mechanism, applying more resistance to the impeded nickel metal sintering during uses, as well as limiting the deposition of alkali metal hydroxide(s)/carbonate(s) on the outer surface of the catalyst pellet.

More importantly, heating the invented three-element reforming catalyst of the present invention, RefCat 3.0, at 450° C. for 3 hours in air does not lead to further formation of macropores, also shown in FIG. 2. Pores of this heated three-element reforming catalyst are mainly distributed between 30 angstroms and 300 angstroms, mostly between 30 angstroms and 200 angstroms. The average pore size was calculated to be 87 angstroms. Such pore size distributions of the reforming catalyst are very unique, as compared to the prior art, for the reforming catalysts that are composed nickel-supported on alumina (a two-element system). Based on theory of E. Ruckenstein and B. Pulvermacher, such unique pore structure of the two-element reforming catalyst will have a longer catalyst life due to the elimination of nickel sintering via an unimpeded diffusion mechanism inside macropores and limiting the deposition of alkali metal hydroxide(s)/carbonate(s) on the outer surface of catalyst pellet.

Most importantly, the incorporation of the third element (such as zirconium) into the two-element reforming catalyst system containing nickel and aluminum slows down the pore size expansion due to calcinations. Ni—Al—Zr three element reforming catalyst system of the present invention shifted its average pore size from 64 angstroms to 87 angstroms, as compared to a shift from 86 angstroms to 107 angstroms for the Ni—Al two-element reforming catalyst system. Such enhancement in pore structure stability against heat is highly desirable for prolonging the life of reforming catalysts by applying more resistance to the nickel metal sintering inside mesopores and micropores against heat.

Furthermore, even though the new compositions of the three element reforming catalyst system of the present invention result in an unique pore structure and an improved pore structure stability for a longer catalyst life, there still observed a shift of the pore sizes to larger pores due to an increase in heating temperature from 200° C. to 450° C. An increase in pore size might not be desirable for prolonging the catalyst life because the degree of impeding nickel sintering via diffusion inside large mesopore or micropores might become less. New compositions have been found in this invention to further slow down the pore size expansion of reforming catalyst by incorporating the forth element. Such forth element is exemplified by precipitating the two-element reforming catalysts of nickel supported on alumina with incorporation of the third and forth elements such as zirconium and cerium, respectively.

As shown in FIG. 3, the precursor of the newly invented four element reforming catalyst, RefCat 4.0, also has a unique pore structure. After heating at 200° C. for 2 hours under a flow of nitrogen, there was negligible amount of macropores detected. Pores that were found have been mainly distributed below 200 angstroms with a pore volume of 0.272 mL/g. The average pore size of the four-element catalyst is located at 65 angstroms. Based on theory of E. Ruckenstein and B. Pulvermacher, the negligible presence of macropores of the reforming catalyst eliminates the sintering of nickel particles via an unimpeded diffusion mechanism during its uses under heat and steam conditions. This is highly desirable for extending the catalyst life due to the absence of nickel metal sintering inside macropores via unimpeding diffusion mechanism.

More importantly, heating the four-element reforming catalyst of the present invention, RefCat 4.0, at 450° C. for 3 hours in air does not lead to further formation of macropores, also shown in FIG. 3. Pores of this heated four-element reforming catalyst are mainly distributed between 30 angstroms and 300 angstroms, mostly between 30 angstroms and 200 angstroms. The average pore size was calculated to be 79 angstroms. Such pore size distributions of the reforming catalyst are very unique, as compared to the prior art, for the reforming catalysts that are composed nickel-supported on alumina (a two-element system). Based on theory of E. Ruckenstein and B. Pulvermacher, such unique pore structure of the four-element reforming catalyst will have a longer catalyst life due to the elimination of nickel sintering via an unimpeded diffusion mechanism during its uses, and limiting the deposition of alkali metal hydroxide(s)/carbonate(s) on the outer surface of catalyst pellets.

Most importantly, the incorporation of the third and forth elements (such as zirconium and cerium) into the two-element reforming catalyst system containing nickel and aluminum slows down the pore size expansion due to calcinations. Ni—Al—Zr—Ce four element reforming catalyst system of the present invention shifted its average pore size from 65 angstroms to 79 angstroms, as compared to a shift from 64 angstroms to 87 angstroms for the Ni—Al—Zr three-element reforming catalyst system of the present invention, due to an increase in heating temperature from 200° C. to 450° C. Such enhancement in pore structure stability against heat is highly desirable for further prolonging the life of reforming catalysts.

Furthermore, even though the new compositions of the four element reforming catalyst system of the present invention result in a unique pore structure and an improved pore structure stability for a longer catalyst life, there still observed a shift of the pore sizes to larger pores due to an increase in calcination temperature from 200° C. to 450° C. An increase in pore size might not be desirable for prolonging the catalyst life because the degree of impeding nickel sintering diffusion inside larger mesopores and/or micropores might become less. New compositions have been found in this invention to further slow down the pore size expansion of reforming catalyst by incorporating a fifth element beyond four element system. Such five-element reforming catalyst system is exemplified by precipitating the two-element reforming catalysts of nickel supported on alumina with incorporation of zirconium, cerium, and silicon.

As shown in FIG. 4, the precursor of the newly invented five element reforming catalyst, RefCat 5.0, also has a unique pore structure. After heating at 200° C. for 2 hours under a flow of nitrogen, there was negligible amount of macropores detected. Pores that were found have been mainly distributed below 200 angstroms with a pore volume of 0.2136 mL/g. The average pore size of the five-element catalyst is located at 59 angstroms. Based on theory of E. Ruckenstein and B. Pulvermacher, the negligible presence of macropores of the reforming catalyst eliminates the sintering of nickel particles via an unimpeded diffusion mechanism during its uses under heat and steam conditions. This is highly desirable for extending the catalyst life due to the absence of nickel metal sintering inside macropores via unimpeding diffusion mechanism and limiting the deposition of alkali metal hydroxide(s)/carbonate(s) on the outer surface of the catalyst pellet.

More importantly, heating the five-element reforming catalyst of the present invention, RefCat 5.0, at 450° C. for 3 hours in air does not lead to further formation of macropores, also shown in FIG. 4. Pores of this heated five-element reforming catalyst are mainly distributed between 30 angstroms and 300 angstroms, mostly between 30 angstroms and 200 angstroms, and even to a narrower range between 30 and 100 angstroms. The average pore size was calculated to be 67 angstroms. Such pore size distributions of the reforming catalyst are very unique, as compared to the prior art, for the reforming catalysts that are composed nickel-supported on alumina (a two-element system). Based on theory of E. Ruckenstein and B. Pulvermacher, such unique pore structure of the five-element reforming catalyst will have a longer catalyst life due to the elimination of nickel sintering via an unimpeded diffusion mechanism during its uses as well as limiting the deposition of alkali metal hydroxide(s)/carbonate(s) to the outer surface of the catalyst pellet.

Most importantly, the incorporation of the third, forth, and fifth elements (such as zirconium, cerium, and silicon) into the two-element reforming catalyst system containing nickel and aluminum slows down the pore size expansion due to calcinations. Ni—Al—Zr—Ce—Si five element reforming catalyst system of the present invention shifted its average pore size from 59 angstroms to 67 angstroms, as compared to a shift from 65 angstroms to 79 angstroms for the Ni—Al—Zr—Ce four-element reforming catalyst system of the present invention, due to an increase in heating temperature from 200° C. to 450° C. Such enhancement in pore structure stability against heat is highly desirable for further prolonging the life of reforming catalysts.

Furthermore, even though the new compositions of the five element reforming catalyst system of the present invention result in a unique pore structure and an improved pore structure stability for a longer catalyst life, there still observed a shift of the pore sizes to larger pores due to an increase in calcination temperature from 200° C. to 450° C. An increase in pore size might not be desirable for prolonging the catalyst life because the degree of impeding nickel sintering diffusion inside larger mesopores and/or micropores might become less. New compositions have been found in this invention to further slow down the pore size expansion of reforming catalyst by incorporating a sixth element into a five element system. Such six-element reforming catalyst system is exemplified by precipitating the two-element reforming catalysts of nickel supported on alumina with incorporation of zirconium, cerium, praseodymium, and neodymium.

As shown in FIG. 5, the precursor of the newly invented six-element reforming catalyst of the present invention, RefCat 6.0, also has a unique pore structure. After heating at 200° C. for 2 hours under a flow of nitrogen, there was negligible amount of macropores detected. Pores that were found have been mainly distributed below 200 angstroms with a pore volume of 0.1262 mL/g. The average pore size of the six-element catalyst is located at 49 angstroms. Based on theory of E. Ruckenstein and B. Pulvermacher, the negligible presence of macropores of the reforming catalyst eliminates the sintering of nickel particles via an unimpeded diffusion mechanism during its uses under heat and steam conditions. This is highly desirable for prolonging the catalyst life due to the absence of nickel metal sintering inside the macropores.

More importantly, heating six-element reforming catalyst of the present invention, RefCat 6.0, at 450° C. for 3 hours in air does not lead to any further formation of macropores, also shown in FIG. 5. Pores of this heated six-element reforming catalyst are mainly distributed between 30 angstroms and 300 angstroms, mostly between 30 angstroms and 200 angstroms, even in the range between 30 angstroms and 100 angstroms. The average pore size was calculated to be 63 angstroms. Such pore size distributions of the reforming catalyst are very unique, as compared to the prior art, for the reforming catalysts that are composed nickel-supported on alumina (a two-element system). Based on theory of E. Ruckenstein and B. Pulvermacher, such unique pore structure of the six-element reforming catalyst will have a longer catalyst life due to the elimination of nickel sintering via an unimpeded diffusion mechanism in macropores during its uses as well as limiting the deposition of alkali metal hydroxide(s)/carbonate(s) on the outer surface of the catalyst pellet.

Most importantly, the incorporation of the third, forth, fifth, and sixth elements (such as zirconium, cerium, praseodymium, and neodymium) into the two-element reforming catalyst system containing nickel and aluminum further slows down the pore size expansion due to calcinations. Ni—Al—Zr—Ce—Pr—Nd six element reforming catalyst system increases its average pore size at 49 angstroms at 200° C. to 63 angstroms at 450° C., as compared to a shift from 59 angstroms to 67 angstroms for the Ni—Al—Zr—Ce—Si five-element reforming catalyst system of the present invention due to an increase in heating temperature from 200° C. to 450° C. Such enhancement in pore structure stability against heat is highly desirable for prolonging the life of reforming catalysts.

Furthermore, even though the new compositions of the six element reforming catalyst system of the present invention result in a unique pore structure and an improved pore structure stability for a longer catalyst life, there still observed a shift of the pore sizes to larger pores due to an increase in calcination temperature from 200° C. to 450° C. An increase in pore size might not be desirable for prolonging the catalyst life because the degree of impeding nickel sintering diffusion inside larger mesopores and/or micropores might become less. New compositions have been found in this invention to further slow down the pore size expansion of reforming catalyst by incorporating a seventh element into a six element system. Such seven-element reforming catalyst system is exemplified by precipitating the two-element reforming catalysts of nickel supported on alumina with incorporation of zirconium, cerium, barium, strontium, and titanium.

As shown in FIG. 6, the precursor of the newly invented seven-element reforming catalyst of the present invention, RefCat 7.0, also has a unique pore structure. After heating at 200° C. for 2 hours under a flow of nitrogen, there was negligible amount of macropores detected. Pores that were found have been mainly distributed below 200 angstroms with a pore volume of 0.2328 mL/g. The average pore size of the six-element catalyst is located at 62 angstroms. Based on theory of E. Ruckenstein and B. Pulvermacher, the negligible presence of macropores of the reforming catalyst eliminates the sintering of nickel particles via an unimpeded diffusion mechanism during its uses under heat and steam conditions. This is highly desirable for prolonging the catalyst life due to the absence of nickel metal sintering inside the macropores.

More importantly, heating seven-element reforming catalyst of the present invention, RefCat 7.0, at 450° C. for 3 hours in air does not lead to any further formation of macropores, also shown in FIG. 6. Pores of this heated seven-element reforming catalyst are mainly distributed between 30 angstroms and 300 angstroms, mostly between 30 angstroms and 200 angstroms, even in the range between 30 angstroms and 100 angstroms. The average pore size was calculated to be 65 angstroms. Such pore size distributions of the reforming catalyst are very unique in the art for the reforming catalysts that are composed nickel-supported on alumina (a two-element system). Based on theory of E. Ruckenstein and B. Pulvermacher, such unique pore structure of the six-element reforming catalyst will have a longer catalyst life due to the elimination of nickel sintering via an unimpeded diffusion mechanism in macropores during its uses as well as limiting the deposition of alkali metal hydroxide(s)/carbonate(s) on the outer surface of the catalyst pellet.

Most importantly, the incorporation of the third, forth, fifth, sixth, and seventh elements (such as zirconium, cerium, barium, strontium, and titanium) into the two-element reforming catalyst system containing nickel and aluminum further slows down the pore size expansion due to calcinations to a level where the pore size expansion seems stopped. Ni—Al—Zr—Ce—Ba—Sr—Ti seven element reforming catalyst system only increases its average pore size for 62 angstroms at 200° C. to 65 angstroms at 450° C. Such unexpected enhancement in pore structure stability against heat by incorporating more elements into the reforming catalyst of nickel supported on alumina is highly desirable for prolonging the life of reforming catalysts.

The enhancement of pore structure stability of nickel-alumina system under heat has been further demonstrated in FIG. 7 and FIG. 8 by incorporating additional element(s) like zirconium, cerium, silicon, praseodymium, neodymium, barium, strontium, titanium, etc. Incorporating additional element(s) into the reforming catalyst of nickel supported on alumina reduces the average pore size of the reforming catalysts to as small as possible by improving the pore structure stability. It seems that the pores of the reforming catalyst (RefCat) shift to smaller pore sizes with every additional element being incorporated into the nickel supported on alumina. Smaller pore size is desirable to limit the speed of nickel sintering by impeding diffusion mechanism for a prolonged catalyst life. And particularly in molten carbonate fuel cells, smaller pore size is desirable to limit the deposition of alkali metal hydroxide(s)/carbonate(s) to the outer surface of the catalyst pellet for a prolonged catalyst life.

Table 3 provided below shows the Hg-Porosimetry results of ratios (1) the mesopore volume between 603 angstroms to 30.2 angstroms to macropore volume between 24,000 angstroms to 603 angstroms, (2) the mesopore volume between 452 angstroms to 30.2 angstroms to macropore volume between 24,000 angstroms to 452 angstroms, (3) the mesopore volume between 362 angstroms to 30.2 angstroms to macropore volume between 24,000 angstroms to 362 angstroms, and (4) the mesopore volume between 259 angstroms to 30.2 angstroms to macropore volume between 24,000 angstroms to 259 angstroms. The ratios of macropore volume to mesopore volume range from 66 to as high as 2505. These results suggest that all RefCat catalysts of the present invention have a negligible amount of macropores, satisfying the definitions of "negligible amount" of macropores provided in the "Summary of the Invention" for different mesopore size ranges.

In particular, the "negligible presence" or "negligible amount" of macropores in the catalysts is defined by a ratio of the mesopore volume to the macropore volume. In certain embodiments of the invention, macropores are defined as pores having sizes that are greater than 603 angstroms and up to 24,000 angstroms, while mesopores are defined as pores having sizes ranging between 30.2 angstroms and 603 angstroms. In other embodiments, macropores are defined as pores having sizes that are greater 452 angstroms and up to 24,000 angstroms, while mesopores are defined as pores having sizes ranging between 30.2 angstroms and 452 angstroms. In some embodiments, macropores are defined as pores having sizes that are greater than 362 angstroms and up to 24,000 angstroms, while mesopores are defined as pores having sizes ranging between 30.2 angstroms and 362 angstroms. Finally, in some embodiments, the macropores are defined as pores having sizes that are greater than 259 angstroms and up to 24,000 angstroms, while mesopores are defined as pores having sizes ranging between 30.2 angstroms and 259 angstroms. The size range for the mesopores and macropores is dependent on the desired use and properties of the catalyst and on the materials used in manufacturing the catalyst. For example, as described above, certain catalysts, such as reforming catalysts for molten carbonate fuel cells, are exposed to deactivating environments, such as electrolyte deposition on the outer surface of the catalyst, and thus, a narrower and smaller size range is desired for the mesopores of such catalysts.

In the embodiments in which the mesopores are defined as pores having sizes between 30.2 and 603 angstroms, the negligible amount, or negligible presence, of macropores is defined as a ratio (R1) of mesopore volume of pores sized between 30.2 and 603 angstroms to macropore volume of pores greater than 603 angstroms and up to 24,000 being greater than 90, as defined by the following equation (1):

$$R1 = \frac{\text{Mesopore Volume of Pores between 603 Å and 30.2 Å}}{\text{Macropore Volume of Pores between 24,000 Å and 452 Å}} > 90 \quad (1)$$

In such embodiments, the ratio of mesopore volume to macropore volume is preferably greater than 105, and more preferably greater than 120.

In the embodiments in which the mesopores are defined as pores having sizes between 30.2 and 452 angstroms, negligible amount, or negligible presence, of macropores is defined as a ratio (R2) of mesopore volume of pores sized between 30.2 and 452 angstroms to macropore volume of pores greater than 452 angstroms and up to 24,000 being greater than 65, as defined by the following equation (2):

$$R2 = \frac{\text{Mesopore Volume of Pores between 452 Å and 30.2 Å}}{\text{Macropore Volume of Pores between 24,000 Å and 452 Å}} > 65 \quad (2)$$

In such embodiments, the ratio of mesopore volume to macropore volume is preferably greater than 75, and more preferably greater than 85.

In the embodiments in which the mesopores are defined as pores having sizes between 30.2 and 362 angstroms, negligible amount, or negligible presence, of macropores is defined as a ratio (R3) of mesopore volume of pores sized between 30.2 and 362 angstroms to macropore volume of pores greater than 362 angstroms and up to 24,000 being greater than 55, as defined by the following equation (3):

$$R3 = \frac{\text{Mesopore Volume of Pores between 362 Å and 30.2 Å}}{\text{Macropore Volume of Pores between 24,000 Å and 362 Å}} > 55 \quad (3)$$

In such embodiments, the ratio of mesopore volume to macropore volume is preferably greater than 65, and more preferably greater than 75.

Finally, in the embodiments in which the mesopores are defined as pores having sizes between 30.2 and 259 angstroms, negligible amount, or negligible presence, of macropores is defined as a ratio (R4) of mesopore volume of pores between 30.2 and 259 angstroms to macropore volume of pores greater than 259 angstroms and up to 24,000 being greater than 30.

$$R4 = \frac{\text{Mesopore Volume of Pores between 259 Å and 30.2 Å}}{\text{Macropore Volume of Pores between 24,000 Å and 259 Å}} > 30 \quad (4)$$

In such embodiments, the ratio of mesopore volume to macropore volume is preferably greater than 40, and more preferably greater than 50.

The following Tables 1-3 describe the physical properties of the RefCat materials described in the above Examples 1-6 and the mesopore volume to macropore volume ratios of the resulting catalysts.

Example 8

BET Surface Area

The BET surface areas of the catalytic samples were measured with a BET surface area instrument manufactured by Micromeritics, Model Tristar 3000. The samples were degassed with a flow of nitrogen at a temperature of 200° C. for two hours in sample preparation equipment manufactured by Micromeritics, Model FlowPrep 060. Then, these degassed samples were analyzed by physisorption of nitrogen under liquid nitrogen temperatures (−195.65° C.). Then surface areas of these samples were calculated with BET equations.

Samples of RefCat 2.0, RefCat 3.0, RefCat 4.0, RefCat 5.0, RefCat 6.0, and RefCat 7.0 were heated at 200° C. for 2 hours under a flow of nitrogen. The BET surface areas of these degassed samples were then determined by the BET instru-

TABLE 1

Physical Properties of RefCat Materials in Surface Areas, Porosities, and Densities.

| 200° C. in $N_2$ for 2 Hours | RefCat 2.0 | RefCat 3.0 | RefCat 4.0 | RefCat 5.0 | RefCat 6.0 | RefCat 7.0 |
|---|---|---|---|---|---|---|
| BET Area, m2/g | 145.3 | 197.6 | 200.2 | 188.6 | 161.4 | 215.0 |
| Total Pore Area, m2/g | 157.4 | 216.0 | 167.7 | 153.1 | 103.5 | 150.6 |
| TPV, mL/g | 0.3378 | 0.3464 | 0.2720 | 0.2136 | 0.1262 | 0.2328 |
| Medium PS (PV), micron | 0.0082 | 0.0063 | 0.0065 | 0.0050 | 0.0040 | 0.0064 |
| Medium PS (PA), micron | 0.0074 | 0.0059 | 0.0054 | 0.0045 | 0.0038 | 0.0052 |
| Average PS, micron | 0.0086 | 0.0064 | 0.0056 | 0.0056 | 0.0049 | 0.0062 |
| Bulk Density (0.18 psi), g/mL | 1.4196 | 1.3744 | 1.4802 | 1.6021 | 1.8571 | 1.5399 |
| Apparent Density (Skeletal), g/mL | 2.5475 | 2.3685 | 2.3204 | 2.2490 | 2.2945 | 2.294 |
| Porosity, % | 46.25% | 45.07% | 38.69% | 32.54% | 22.45% | 34.81% |
| Pyconometer Density, g/mL | 2.8686 | 3.0246 | 2.9280 | 2.9272 | 2.8256 | 2.8971 |
| Pyconometer Porosity, % | 50.50% | 55.40% | 49.4% | 45.3% | 34.3% | 46.80% |

TABLE 2

Physical Properties of RefCat Materials in Surface Areas, Porosities, and Densities.

| 450° C. in Air for 3 hours | RefCat 2.0 | RefCat 3.0 | RefCat 4.0 | RefCat 5.0 | RefCat 6.0 | RefCat 7.0 |
|---|---|---|---|---|---|---|
| BET Area, m2/g | 210.0 | 234.8 | 239.5 | 229.0 | 219.1 | 243.1 |
| Total Pore Area, m2/g | 175.0 | 233.4 | 240.0 | 238.8 | 213.8 | 224.9 |
| TPV, mL/g | 0.4632 | 0.5077 | 0.4733 | 0.3982 | 0.3345 | 0.4202 |
| Medium PS (PV), micron | 0.0102 | 0.0083 | 0.0074 | 0.0064 | 0.0061 | 0.0070 |
| Medium PS (PA), micron | 0.0094 | 0.0082 | 0.0072 | 0.0064 | 0.0060 | 0.0068 |
| Average PS, micron | 0.0107 | 0.0087 | 0.0079 | 0.0067 | 0.0063 | 0.0065 |
| Bulk Density (0.18 psi), g/mL | 1.3892 | 1.3164 | 1.4100 | 1.5673 | 1.7346 | 1.5123 |
| Apparent Density (Skeletal), g/mL | 3.6405 | 3.6098 | 3.8009 | 3.9643 | 3.8803 | 3.5726 |
| Porosity, % | 62.80% | 64.70% | 64.3% | 61.2% | 56.5% | 60.00% |
| Pyconometer Density, g/mL | 3.9799 | 4.2455 | 4.3349 | 4.1995 | 4.3047 | 4.343 |
| Pyconometer Porosity, % | 65.10% | 69.00% | 67.5% | 62.7% | 59.7% | 65.20% |

TABLE 3

The Ratios of Mesopore Volumes to Macropore Volumes of RefCat Materials.

| Samples | Ratio $PV_{(603\text{-}30.2\ Å)}$ to $PV_{(24,000\text{-}603\ Å)}$ | Ratio $PV_{(452\text{-}30.2\ Å)}$ to $PV_{(24,000\text{-}452\ Å)}$ | Ratio $PV_{(362\text{-}30.2\ Å)}$ to $PV_{(24,000\text{-}362\ Å)}$ | Ratio $PV_{(259\text{-}30.2\ Å)}$ to $PV_{(24,000\text{-}259\ Å)}$ |
|---|---|---|---|---|
| RefCat 2.0 | 158 | 118 | 97 | 66 |
| RefCat 3.0 | 280 | 202 | 164 | 112 |
| RefCat 4.0 | 154 | 120 | 101 | 74 |
| RefCat 5.0 | 354 | 265 | 211 | 151 |
| RefCat 6.0 | 766 | 551 | 413 | 287 |
| RefCat 7.0 | 2505 | 799 | 487 | 231 | ment. Samples of RefCat 2.0, RefCat 3.0, RefCat 4.0, RefCat 5.0, RefCat 6.0, and RefCat 7.0 were also heated to 450° C. in a furnace for 3 hours separately and followed by the same degassing procedures at 200° C. under a flow of nitrogen for 2 hours. Then, these degassed samples were analyzed with the BET surface area instrument. The results of BET surface areas of these heated samples are shown in Table 1 and Table 2. The results show that reforming catalysts of the present invention have very high surface areas, which is highly advantageous for catalytic activities and catalyst life. The BET surface areas of reforming catalysts that were heated at 450° C. in air for 3 hours seem to be the same as the total pore areas determined by mercury protrusion. This suggests that pores of the reforming catalysts (heated at 450° C.) of the present invention locate between 30 angstroms to 300 angstroms since the method of mercury protrusion only measure down to the pore size of 30.2 angstroms, while the BET surface area method measures the pores down to about 3 to 4 angstroms.

Example 9

TGA-DSC

Thermal Gravimetric Analysis and Differential Scanning Carlorimetry (TGA-DSC) of the catalytic samples were analyzed on an instrument manufactured by Netzsch, Model Netzsch STA 409 PC/PG. Each sample was loaded on an alumina sample pan and analyzed under a flow of dry air (20 mL/min) with a temperature ramping rate of 20° C./min from 25° C. to 900° C. The results of TGA-DSC analysis of samples RefCat 3.0 and RefCat 7.0 are plotted in FIG. 9.

FULL CITATIONS FOR REFERENCES

I. US Patents and US Patent Applications

1. Cai; Yeping, Faris; William M., Riley; Jeffery E., Riley; Robert E., Tolle; David P., Wagner; Jon P., Zhao; Shizhong, "Process for the preparation of promoted calcium-aluminate supported catalysts", U.S. Pat. No. 7,378,370, May 27, 2008.
2. Zhao; Shizhong, Cai; Yeping, Ladebeck; Jurgen, "Nickel supported on titanium stabilized promoted calcium aluminate carrier", U.S. Pat. No. 7,378,369, May 27, 2008.
3. Fukunaga; Tetsuya, Yanagino; Tomoki, Takatsu; Kozo, Umeki; Takashi, "Catalyst for reforming hydrocarbon and method for preparation thereof, and process for reforming hydrocarbon using said catalyst", U.S. Pat. No. 7,378,368, May 27, 2008
4. Fukunaga; Tetsuya, "Catalyst for hydrocarbon reforming and method of reforming hydrocarbon with the same", U.S. Pat. No. 7,166,268, Jan. 23, 2007.
5. R. O. Idem, P. Kumar, "Catalysts for Hydrogen Production", US Patent Application, Pub. No. 2006/0216227, Sep. 28, 2006.
6. Zhao; Shizhong, Wagner; Jon P., "Process for catalytic reforming", U.S. Pat. No. 6,984,371, Jan. 10, 2006.
7. Lesieur; Roger R., "Compact light weight autothermal reformer assembly", U.S. Pat. No. 6,969,411, Nov. 29, 2005.
8. Bhattacharyya; Alakananda, Chang; Wen-Dong, "Preparing synthesis gas using hydrotalcite-derived nickel catalysts", U.S. Pat. No. 6,953,488, Oct. 11, 2005.
9. de Lasa; Hugo Ignacio, Ei Solh; Tarek, Jarosch; Kai, "Catalyst for hydrocarbon reforming reaction", U.S. Pat. No. 6,852,668, Feb. 8, 2005.
10. Park; Sang-Eon, Jun; Ki-Won, Roh; Hyun-Seog, Baek; Seung-Chan, Oh; Young-Sam, Baek; Young-Soon, Choi; Ri-Sang, Song; Taek-Yong, "Modified θ-Alumina-supported nickel reforming catalyst and its use for producing synthesis gas from natural gas", U.S. Pat. No. 6,808,652, Oct. 26, 2004.
11. Dieckmann; Gunther H., "Process for reducing metal catalyzed coke formation in hydrocarbon processing, U.S. Pat. No. 6,803,029, Oct. 12, 2004.
12. Lesieur; Roger R., "Compact light weight autothermal reformer assembly", U.S. Pat. No. 6,797,244, Sep. 28, 2004.
13. Lesieur; Roger R., "Compact, light weight methanol fuel gas autothermal reformer assembly", U.S. Pat. No. 6,746,650, Jun. 8, 2004.
14. Park; Sang-Eon, Jun; Ki-Won, Roh; Hyun-Seog, Baek; Seung-Chan, Oh; Young-Sam, Baek; Young-Soon, Choi; Ri-Sang, Song; Taek-Yong, "Modified θ-Al2O3-supported nickel reforming catalyst and its use for producing synthesis gas from natural gas", U.S. Pat. No. 6,693,060, Feb. 17, 2004.
15. Stevens; James F., "Integrated fuel processor, fuel cell stack, and tail gas oxidizer with carbon dioxide removal", U.S. Pat. No. 6,682,838, Jan. 27, 2004.
16. Lewis; Gregory J., Bauer; John E., "Low coke formation catalysts and process for reforming and synthesis gas production", U.S. Pat. No. 6,544,439, Apr. 8, 2003.
17. Dohrup; Jesper, Jacobsen; Claus J. H., Olsen; Christian, "Process for catalytical steam reforming of a hydrocarbon feedstock", U.S. Pat. No. 6,416,731, Jul. 9, 2002.
18. Choudhary; Vasant Ramchandra, Uphade; Balu Shivaji, Mamman; Ajit Singh, Rajput; Amarjeet Munshiram, "Process for the catalytic conversion of methane or natural gas to syngas or a mixture of carbon monoxide and hydrogen", U.S. Pat. No. 6,293,979, Sep. 25, 2001.
19. Park; Sang-Eon, Chang; Jong-San, Lee; Kyu-Wan, "Process for preparing supported nickel catalyst for reforming hydrocarbons", U.S. Pat. No. 6,242,380, Jun. 5, 2001.
20. Hyldtoft; Jens, N.o slashed.rskov; Jens Kehlet, Clausen; Bjerne Steffen, "Process for steam reforming of hydrocarbons", U.S. Pat. No. 5,997,835, Dec. 7, 1999.
21. Galperin; Leonid B., "Hydrocarbon conversion process using a sulfur tolerant catalyst", U.S. Pat. No. 5,954,948, Sep. 21, 1999.
22. Ino; Takashi, Seike; Tadashi, "Process for producing fuel gas for fuel cell", U.S. Pat. No. 5,800,798, Sep. 1, 1998.
23. Shoji; Kazuo, Mogami; Ryuichi, Numaguchi; Toru, Matsuhisa; Toshio, Yanaru; Hideaki, Nishioka; Yasuo, Izawa; Yasuhiro, "Steam reforming catalysts for lower hydrocarbons", U.S. Pat. No. 5,773,589, Jun. 30, 1998.
24. Bhattacharyya; Alakananda, Chang; Wen-Dong, Kleefisch; Mark S., Udovich; Carl A., "Catalyst prepared from nickel-containing hydrotalcite-like precursor compound", U.S. Pat. No. 5,767,040, Jun. 16, 1998.
25. Bhattacharyya; Alakananda, Chang; Wen-Dong, Kleefisch; Mark S., Udovich; Carl A., "Method for preparing synthesis gas using nickel catalysts", U.S. Pat. No. 5,653,774, Aug. 5, 1997.
26. Ul-Haque; Israr, Trimm; David L., "Catalyst for steam reforming of hydrocarbons", U.S. Pat. No. 5,599,517, Feb. 4, 1997.
27. Ul-Haque; Israr, Trimm; David L., "Process for steam reforming of hydrocarbons", U.S. Pat. No. 5,595,719, Jan. 21, 1997.

28. Bhattacharyya; Alakananda, Chang; Wen-Dong, Kleefisch; Mark S., Udovich; Carl A., "Method for preparing synthesis gas using nickel catalysts", U.S. Pat. No. 5,591,238, Jan. 7, 1997.
29. Bhattacharyya; Alakananda (Wheaton, Ill.), Chang; Wen-Dong (Houston, Tex.), Kleefisch; Mark S. (Plainfield, Ill.), Udovich; Carl A., "Method for preparing and using nickel catalysts", U.S. Pat. No. 5,939,353, Aug. 17, 1999.
30. Willms; R. Scott, "Method for simultaneous recovery of hydrogen from water and from hydrocarbons", U.S. Pat. No. 5,525,322, Jun. 11, 1996.
31. Hansen; Jens-Henrik B., Storgaard; Leif, Jensen; Poul E., "Process for the steam reforming of hydrocarbons", U.S. Pat. No. 5,498,404, Mar. 12, 1996.
32. Bhattacharyya; Alakananda, Chang; Wen-Dong, Kleefisch; Mark S., Udovich; Carl A., "Method for preparing synthesis gas using nickel catalysts", U.S. Pat. No. 5,399,537, Mar. 21, 1995.
33. Fujisou; Tokuo, Hayashi; Shigeyuki, Nomura; Soichi, Obuchi; Akira, Kato; Hideharu, "Process for hydrogen production from kerosene", U.S. Pat. No. 5,130,115, Jul. 14, 1992.
34. Igarashi; Akira, "Catalyst for steam reforming of hydrocarbon", U.S. Pat. No. 5,130,114, Jul. 14, 1992.
35. Sato; Nobuhiro, Ohsaki; Kozo, Kikuchi; Katsutoshi, Hirota; Yoshitsugu, Numaguchi; Toru, Mochiduki; Noboru, "Catalyst for steam reforming", U.S. Pat. No. 5,100,857, Mar. 31, 1992.
36. Kurashige; Mitsuhiko (Tsukuba, JP), Takiguchi; Makoto (Inashiki, JP), Matsuo; Noriko (Inashiki, JP), "Regeneration method for methanol-reforming catalyst", U.S. Pat. No. 5,075,268, Dec. 24, 1991.
37. Giordano; Nicola, Parmaliana; Adolfo, Frusteri; Francesco, Sasaki; Shigeo, Yoshida; Yasushi, Nitta; Kuniaki, "High-activity nickel catalyst and process for preparation thereof", U.S. Pat. No. 5,053,379, Oct. 1, 1991.
38. Ganguli; Keshab L., Nootenboom; Peter, Lok; Cornelis K., "Nickel/alumina catalyst, its preparation and use", U.S. Pat. No. 5,047,178, Sep. 10, 1991.
39. Sato; Nobuhiro, Ohsaki; Kozo, Kikuchi; Katsutoshi, Hirota; Yoshitsugu, Numaguchi; Toru, Mochiduki; Noboru, "Catalyst for steam reforming", U.S. Pat. No. 4,990,481, Feb. 5, 1991.
40. Arai; Hiromichi, Kitagawa; Jun, Nishioka; Yasuo, "Steam reforming catalyst for hydrocarbons and method of producing the catalyst", U.S. Pat. No. 4,988,661, Jan. 29, 1991.
41. Burgfels; Gotz, Kochloefl; Karl, "Catalyst for the steam reforming of hydrocarbons", U.S. Pat. No. 4,906,603, Mar. 6, 1990.
42. Twigg; Martyn V., Sengelow; William M., "Catalysts for reforming hydrocarbon feedstocks", U.S. Pat. No. 4,863,712, Sep. 5, 1989.
43. Banks; Reginald G. S., "Production of methane containing gases", U.S. Pat. No. 4,824,440, Apr. 25, 1989.
44. Twigg; Martyn V., Sengelow; William M., "Foam catalysts, method of manufacture and method of using", U.S. Pat. No. 4,810,685, Mar. 7, 1989.
45. Buss; Waldeen C., "Reforming process", U.S. Pat. No. 4,645,586, Feb. 24, 1987.
46. Bailey; George W., Swan; George A., "Nickel adsorbent for sulfur removal from hydrocarbon feeds", U.S. Pat. No. 4,634,515, Jan. 6, 1987.
47. Oudejans; Johannes C. (Delft, N L), Nootenboom; Peter (Oud-Beyerland, NL), Ganguli; Keshab L. (Bleiswijk, N L), Lok; Cornelis M., "Nickel/alumina/silicate catalyst, its preparation", U.S. Pat. No. 4,631,265, Dec. 23, 1986.
48. Twigg; Martyn V. "Steam reforming", U.S. Pat. No. 4,568,583, Feb. 4, 1986.
49. Sambrook; Rodney M., Ross; Julian R. H., "Catalysts and method of their preparation", U.S. Pat. No. 4,530,918, Jul. 23, 1985.
50. Setzer; Herbert J., "Steam reforming utilizing high activity catalyst", U.S. Pat. No. 4,503,029, Mar. 5, 1985.
51. Sambrook; Rodney M., Ross; Julian R. H., "Catalyst and method of preparation", U.S. Pat. No. 4,469,815, Sep. 4, 1984.
52. Aldridge; Clyde L., "High surface area nickel aluminate spinel catalyst for steam reforming", U.S. Pat. No. 4,456,703, Jun. 26, 1984.
53. Kitchener; Ivor J., "Passivated CRG catalysts", U.S. Pat. No. 4,455,391, Jun. 19, 1984.
54. Setzer; Herbert J., "Catalyst for steam reforming", U.S. Pat. No. 4,414,140, Nov. 8, 1983.
55. Schurmans; Jacques, "Catalyst carrier", U.S. Pat. No. 4,402,870, Sep. 6, 1983.
56. McMahon; Joseph F., Steiner; Peter, "Process for activating a steam reforming catalyst and the catalyst produced by the process", U.S. Pat. No. 4,400,309, Aug. 23, 1983.
57. Ohsaki; Kozo, Hirokawa; Kazuo, Fukuda; Goro, Otsuka; Kozi, Tomita; Tadayoshi, "Process for hydrocarbon reforming and apparatus therefore", U.S. Pat. No. 4,371,452, Feb. 1, 1983.
58. Sato; Nobuhiro, Yamaguchi; Yoshinobu, Kodama; Hitoshi, Koshdyama; Isamu, Kitano; Nanahiko, Tsutsumi; Shigeharu, "Catalyst for steam reforming of hydrocarbons", U.S. Pat. No. 4,285,837, Aug. 25, 1981.
59. Banks; Reginald G. S., Williams; Alan, "Steam reforming process", U.S. Pat. No. 4,280,820, Jul. 28, 1981.
60. Russ; Karl J., Broughton; Donald R., "Process for steam reforming of hydrocarbons", U.S. Pat. No. 4,233,179, Nov. 11, 1980.
61. Banks; Reginald G. S., Williams; Alan, "Catalyst for steam reforming of hydrocarbons", U.S. Pat. No. 4,216,123, Aug. 5, 1980.
62. Russ; Karl J., Broughton; Donald R., "Catalyst for steam reforming of hydrocarbons and process of preparing the catalyst", U.S. Pat. No. 4,207,211, Jun. 10, 1980.
63. Takeuchi; Masato, Matsuda; Shinpei, Okada; Hideo, Kawagoshi; Hiroshi, Nakajima; Fumito, "Hydrodesulfurization of hydrocarbon oil with a catalyst including titanium oxide", U.S. Pat. No. 4,206,036, Jun. 3, 1980.
64. McArthur; Dennis P., "Thermally stable nickel-alumina catalysts useful for methanation and other reactions", U.S. Pat. No. 4,191,664, Mar. 4, 1980.
65. Harle; Virginie, Kazstelan; Slavik, Morel; Frederic; Kressmann; Stephane, Courty; Philippe, "Catalyst for hydrotreating hydrocarbon feeds in a fixed bed reactor", U.S. Pat. No. 6,043,187, Mar. 28, 2000.
66. Nelson; Gerald V., Nongbri; Govanon, Pratt; Roy E., Sherwood; David E., Dai; Pei-Shing E., "Catalyst with specified pore size distribution", U.S. Pat. No. 5,545,602, Aug. 13, 1996.
67. Komodromos; Costa, Williams; Alan, Parkyns; Norman, "Process for the production of methane-containing gases and catalyst used in process", U.S. Pat. No. 4,185,967, Jan. 29, 1980.
68. "Hydrogenation and hydrocracking with highly dispersed supported nickel catalysts", U.S. Pat. No. 4,142,962, Mar. 6, 1979.
69. Johnson; Marvin M., Nowack; Gerhard P., "Hydrocarbon steam reforming process", U.S. Pat. No. 4,140,493, Feb. 20, 1979.

70. Banks; Reginald George Sinclair, Paterson; David James, Williams; Alan, "Catalytic steam reforming and catalysts therefore", U.S. Pat. No. 4,104,201, Aug. 1, 1978.
71. Villemin; Bernard, "Steam reformer process for the production of hydrogen", U.S. Pat. No. 4,089,941, May 16, 1978.
72. Yates; David J. C., Murrell; Lawrence L., "Method for preparing a highly dispersed supported nickel catalyst", U.S. Pat. No. 4,073,750, Feb. 14, 1978.
73. Engelhard; Philippe (Le Havre, FR), Weisang; Joseph Edouard (Le Havre, FR), Paris; Guy, "Catalysts for the hydrotreatment of hydrocarbons and a process for the preparation and utilization thereof", U.S. Pat. No. 4,071,437, Jan. 31, 1978.
74. Johnson; Marvin M. (Bartlesville, Okla.), Nowack; Gerhard P., "Process for producing methane from carbon monoxide and steam", U.S. Pat. No. 4,071,331, Jan. 31, 1978.
75. Kawagoshi; Hiroshi (Hitachi, JA), Takeuchi; Masato (Katsuta, JA), Nakajima; Fumito, "Process for steam reforming of hydrocarbons", U.S. Pat. No. 4,060,498, Nov. 29, 1977.
76. McArthur; Dennis P., "Thermally stable nickel-alumina catalysts useful for methanation and other reactions and method for the manufacture of said catalysts", U.S. Pat. No. 4,042,532, Aug. 16, 1977.
77. Van Hook; James P., Yarze; Joseph C., "Hydrocarbon reforming catalyst and method for preparing same, U.S. Pat. No. 4,026,823, May 31, 1977.
78. Johnson; Marvin M. (Bartlesville, Okla.), Nowack; Gerhard P., "Hydrocarbon steam reforming and methanation catalysts", U.S. Pat. No. 4,017,424, Apr. 12, 1977.
79. Uemoto; Kunihiko (Yokohama, JA), Shichiji; Satoru (Yokohama, JA), Amemiya; Yoshinori, "Low-temperature steam reforming process for hydrocarbons", U.S. Pat. No. 4,000,988, Jan. 4, 1977.
80. Okagami; Akio (Fuchu, JA), Uemoto; Kunihiko (Yokohama, JA), Satoh; Kouichi, "Low-temperature steam reforming process for hydrocarbons", U.S. Pat. No. 4,000,987, Jan. 4, 1977.
81. Takeuchi; Yukihisa, "Catalyst for reforming hydrocarbon fuel", U.S. Pat. No. 3,997,477, Dec. 14, 1976.

II. Literature

1. E. Ruckenstein and B. Pulvermacher, "Effect of the Pore Size on the Aging of Supported Metals", J. Catal. 37, 416-432 (1975).
2. A. Williams, G. Butler, and J. Hammonds, "Sintering of Nickel-Alumina Catalysts", J. Catal. 24, 352-355 (1972).
3. J. R. Rostrup-Nielsen, "Activity of Nickel Catalysts for Steam Reforming of Hydrocarbons", J. Catal. 31, 173-199 (1973).
4. E. J. Erekson, E. Sughrue, and C. H. Bartholomew, "Catalyst Deactivation in High Temperature Methanation", Fuel Processing Technology 5, 91-101 (1981).
5. T. Mori, K. Higashiyama, and S. Yoshioka, "Steam Reforming Reaction of Methane in Internally-Reformed Molten Carbonate Fuel Cell", J. Electrochem. Soc., 136 (8), 2230-2233 (1989)
6. T. Numaguchi, "Highly Active Steam Reforming Catalyst for Hydrogen and Syngas Production", Catalysis Survey from Japan, 5 (1), 59-63 (2001)
7. H.-K. Park, Y.-R. Lee, M.-Hyun Kim, G.-Y. Chung, S.-W. Nam, S.-A. Hong, T.-H. Lim, and H.-C. Lim, "Studies of the Effects of the Reformer in an Internal-Reforming Molten Carbonate Fuel Cell by Mathematical Modeling", J. of Power Sources, 104, 140-147 (2002).
8. J. Sehested, "Sintering of Nickel Steam-Reforming Catalysts", J. Catal. 217, 417-426 (2003).
9. J. Sehested, J. A. P. Gelten, I. N. Remediakis, H. Bengaard, and J. K. Norskow, "Sintering of Nickel Steam-Reforming Catalysts: Effects of Temperature and Steam and Hydrogen Pressures", J. Catal. 223, 432-443 (2004).
10. J.-H. Wee and K.-Y. Lee, "Carbon Deposition and Alkali Poisoning at Each Point of the Reforming Catalysts in DIR-MCFC", J. Appl. ElectroChem. 35, 521-528 (2005).
11. A. Ishihara, E. W. Qian, I. N. Finahari, I. P. Sutrisna, T. Kabe, "Addition Effect of Ruthenium on Nickel Steam Reforming Catalysts", Fuel 84, 1462-1468 (2005).
12. S. H. Clarke and T. A. Smith, "Deactivation of Steam Reforming Catalysts for Molten Carbonate Fuel Cell Applications", Catalyst Deactivation 52, 449-458 (1994).
13. J. R. Rostrup-Nielson, L. J. Christiansen, "Internal Steam Reforming in Fuel Cells and Alkali Poisoning", Appl. Catal. A: General 126, 381-390 (1995).
14. D. L. Trimm, "Coke Formation and Minimization during Steam Reforming Reactions", Catal. Today 37, 233-238 (1997).
15. S. Wang, G. Q. (Max) Lu, "Role of $CeO_2$ in $Ni/Al_2O_3$ Catalysts for Carbon Dioxide Reforming of Methane", Appl. Catal. B: Environmental 19, 267-277 (1998).
16. A. Parmaliana, F. Arena, F. Frusteri, N. Mondello, and N. Giordano, "Influence of Alkali Metals (Li and K) Addition to Ni/MgO Catalyst", Catalyst Deactivation, P. 489-492 (1991).
17. R. J. Berger, E. B. M. Doesburg, J. G. van Ommen, "Nickel Catalysts for Internal Reforming in Molten Carbonate Fuel Cells", Appl. Catal. A: General 143, 343-365 (1996).
18. R. J. Berger, E. B. M. Doesburg, J. G. van Ommen, and J. R. H. Ross, "Deactivation Behavior of Nickel Catalysts Used for Internal Reforming in Molten Carbonate Fuel Cells", Natural Gas Conversion 11, 309-313 (1994).
19. S. Cavallaro, S. Freni, R. Cannistraci, M. Aquinno and N. Giordano, "Alkali Effect on the MCFC-Internal Reforming Catalyst Life", Int. J. Hydrogen Energy 17(3), 181-186 (1992).
20. R. J. Berger, E. B. M. Doesburg, J. G. van Ommen, "Investigation of Alkali Carbonate Transport Toward the Catalyst in Internal Reforming MCFCs", J. Electrochem. Soc. 143(10), 3186-3191 (1996).
21. J. Xu, G. F. Froment, "Methane Steam Reforming, Methanation and Water-Gas Shift: I. Intrinsic Kinetics", AlChE Journal 35 (1), 88-96 (1989).
22. J. Xu, G. F. Froment, "Methane Steam Reforming: II. Diffusional Limitations and Reactor Simulation", AlChE Journal 35 (1), 97-103 (1989).

We claim:

1. A catalyst comprising nickel supported on an alumina support formed from precursor materials comprising nickel and aluminum, said catalyst comprising a plurality of mesopores and a negligible amount of macropores, wherein one of:
   (1) said mesopores have a size between 30.2 and 603 angstroms and said macropores have a size greater than 603 angstroms and up to 24,000 angstroms, and said negligible amount of said macropores is such that:

$$R1 = \frac{\text{Mesopore Volume of Pores between 603 Å and 30.2 Å}}{\text{Macropore Volume of Pores between 24,000 Å and 603 Å}} > 90$$

(2) said mesopores have a size between 30.2 and 452 angstroms and said macropores have a size greater than 452 angstroms and up to 24,000 angstroms, and said negligible amount of said macropores is such that:

$$R2 = \frac{\text{Mesopore Volume of Pores between 452 Å and 30.2 Å}}{\text{Macropore Volume of Pores between 24,000 Å and 452 Å}} > 65$$

(3) said mesopores have a size between 30.2 and 362 angstroms and said macropores have a size greater than 362 angstroms and up to 24,000 angstroms, and said negligible amount of said macropores is such that:

$$R3 = \frac{\text{Mesopore Volume of Pores between 362 Å and 30.2 Å}}{\text{Macropore Volume of Pores between 24,000 Å and 362 Å}} > 55;$$

and (4) said mesopores have a size between 30.2 and 259 angstroms and said macropores have a size greater than 259 angstroms and up to 24,000 angstroms, and said negligible amount of said macropores is such that:

$$R4 = \frac{\text{Mesopore Volume of Pores between 259 Å and 30.2 Å}}{\text{Macropore Volume of Pores between 24,000 Å and 259 Å}} > 30.$$

2. A catalyst comprising nickel supported on an alumina support formed from precursor materials comprising nickel and aluminum, said catalyst comprising a plurality of mesopores and a negligible amount of macropores, wherein one of:
(1) said mesopores have a size between 30.2 and 603 angstroms and said macropores have a size greater than 603 angstroms and up to 24,000 angstroms, and said negligible amount of said macropores is such that:

$$R1 = \frac{\text{Mesopore Volume of Pores between 603 Å and 30.2 Å}}{\text{Macropore Volume of Pores between 24,000 Å and 603 Å}} > 105$$

(2) said mesopores have a size between 30.2 and 452 angstroms and said macropores have a size greater than 452 angstroms and up to 24,000 angstroms, and said negligible amount of said macropores is such that:

$$R2 = \frac{\text{Mesopore Volume of Pores between 452 Å and 30.2 Å}}{\text{Macropore Volume of Pores between 24,000 Å and 452 Å}} > 75$$

(3) said mesopores have a size between 30.2 and 362 angstroms and said macropores have a size greater than 362 angstroms and up to 24,000 angstroms, and said negligible amount of said macropores is such that:

$$R3 = \frac{\text{Mesopore Volume of Pores between 362 Å and 30.2 Å}}{\text{Macropore Volume of Pores between 24,000 Å and 362 Å}} > 65;$$

and (4) said mesopores have a size between 30.2 and 259 angstroms and said macropores have a size greater than 259 angstroms and up to 24,000 angstroms, and said negligible amount of said macropores is such that:

$$R4 = \frac{\text{Mesopore Volume of Pores between 259 Å and 30.2 Å}}{\text{Macropore Volume of Pores between 24,000 Å and 259 Å}} > 40.$$

3. A catalyst comprising nickel supported on an alumina support formed from precursor materials comprising nickel and aluminum, said catalyst comprising a plurality of mesopores and a negligible amount of macropores, wherein one of:
(1) said mesopores have a size between 30.2 and 603 angstroms and said macropores have a size greater than 603 angstroms and up to 24,000 angstroms, and said negligible amount of said macropores is such that:

$$R1 = \frac{\text{Mesopore Volume of Pores between 603 Å and 30.2 Å}}{\text{Macropore Volume of Pores between 24,000 Å and 603 Å}} > 120 \quad (1)$$

(2) said mesopores have a size between 30.2 and 452 angstroms and said macropores have a size greater than 452 angstroms and up to 24,000 angstroms, and said negligible amount of said macropores is such that:

$$R2 = \frac{\text{Mesopore Volume of Pores between 452 Å and 30.2 Å}}{\text{Macropore Volume of Pores between 24,000 Å and 452 Å}} > 85 \quad (2)$$

(3) said mesopores have a size between 30.2 and 362 angstroms and said macropores have a size greater than 362 angstroms and up to 24,000 angstroms, and said negligible amount of said macropores is such that:

$$R3 = \frac{\text{Mesopore Volume of Pores between 362 Å and 30.2 Å}}{\text{Macropore Volume of Pores between 24,000 Å and 362 Å}} > 75; \quad (3)$$

and (4) said mesopores have a size between 30.2 and 259 angstroms and said macropores have a size greater than 259 angstroms and up to 24,000 angstroms, and said negligible amount of said macropores is such that:

$$R4 = \frac{\text{Mesopore Volume of Pores between 259 Å and 30.2 Å}}{\text{Macropore Volume of Pores between 24,000 Å and 259 Å}} > 50. \quad (4)$$

4. The catalyst according to any of preceding claims, wherein said catalyst is one of:
a reforming catalyst; and
a reforming catalyst in molten carbonate fuel cells.

5. A catalyst in accordance with any of claims 1, 2 and 3, further comprising a third element, wherein said third element comprises one of a transition metal, a Group IVB element, a Group VB element, a Group VIB element, a Group IIIB element, a Lanthanum Group element, a Rare Earth Metal Group element, a Group II Alkali Earth Metal, a Group IIIA element, a Group IVA element, antimony and bismuth.

6. A catalyst in accordance with claim 5, wherein said third element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium.

7. A catalyst in accordance with any of claims 5 and 6, wherein said catalyst is one of:
a reforming catalyst; and
a reforming catalyst for molten carbonate fuel cells.

8. A catalyst in accordance with claim 5, further comprising a fourth element, wherein said fourth element comprises one of a transition metal, a Group IVB element, a Group VB element, a Group VIB element, a Group IIIB element, a Lanthanum Group element, a Rare Earth Metal Group element, a Group II Alkali Earth Metal, a Group IIIA element, a Group IVA element, antimony and bismuth.

9. A catalyst in accordance with claim 8, wherein:
said third element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium; and
said fourth element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium.

10. A catalyst in accordance with any of claims 8 and 9, wherein said catalyst is one of:
a reforming catalyst; and
a reforming catalyst for molten carbonate fuel cells.

11. A catalyst in accordance with claim 8, further comprising a fifth element, wherein said fifth element comprises one of a transition metal, a Group IVB element, a Group VB element, a Group VIB element, a Group IIIB element, a Lanthanum Group element, a Rare Earth Metal Group element, a Group II Alkali Earth Metal, a Group IIIA element, a Group IVA element, antimony and bismuth.

12. A catalyst in accordance with claim 11, wherein:
said third element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium;
said fourth element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium; and
said fifth element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium.

13. A catalyst in accordance with any of claims 11 and 12, wherein said catalyst is one of:
a reforming catalyst; and
a reforming catalyst for molten carbonate fuel cells.

14. A catalyst in accordance with claim 11, further comprising a sixth element, wherein said sixth element comprises one of a transition metal, a Group IVB element, a Group VB element, a Group VIB element, a Group IIIB element, a Lanthanum Group element, a Rare Earth Metal Group element, a Group II Alkali Earth Metal, a Group IIIA element, a Group IVA element, antimony and bismuth.

15. A catalyst in accordance with claim 14, wherein:
said third element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium;
said fourth element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium;
said fifth element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium; and
said sixth element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium.

16. A catalyst in accordance with any of claims 14 and 15, wherein said catalyst is one of:
a reforming catalyst; and
a reforming catalyst for molten carbonate fuel cells.

17. A catalyst in accordance with claim 14, further comprising a seventh element, wherein said seventh element comprises one of a transition metal, a Group IVB element, a Group VB element, a Group VIB element, a Group IIIB element, a Lanthanum Group element, a Rare Earth Metal Group element, a Group II Alkali Earth Metal, a Group IIIA element, a Group IVA element, antimony and bismuth.

18. A catalyst in accordance with claim 17, wherein:
said third element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium;
said fourth element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium;
said fifth element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium;
said sixth element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium; and
said seventh element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium.

19. A catalyst in accordance with any of claims 17 and 18, wherein said catalyst is one of:
a reforming catalyst; and
a reforming catalyst for molten carbonate fuel cells.

20. A catalyst in accordance with claim 17, further comprising one or more additional elements, wherein each said additional element comprises one of a transition metal, a Group IVB element, a Group VB element, a Group VIB element, a Group IIIB element, a Lanthanum Group element, a Rare Earth Metal Group element, a Group II Alkali Earth Metal, a Group IIIA element, a Group IVA element, antimony and bismuth.

21. A catalyst in accordance with claim 20, wherein:
said third element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium;
said fourth element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium;
said fifth element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium;
said sixth element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium;
said seventh element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium; and
each said additional element comprises one of titanium, zirconium, hafnium, yttrium, lanthanum, cerium, praseodymium, neodymium, boron, silicon, tin, antimony, bismuth, niobium, molybdenum, tungsten, magnesium, calcium, strontium and barium.

22. A catalyst in accordance with any of claims 20 and 21, wherein said catalyst is one of:
a reforming catalyst; and
a reforming catalyst for molten carbonate fuel cells.

23. A method of manufacturing a catalyst in accordance with any of claims 1-4, comprising the steps of:
providing a first solution comprising one or more nickel salts, wherein said first solution is one of a solution and a dispersion;
providing a second solution comprising at least one of aluminate, carbonate, bicarbonate and a base;
reacting said first solution with said second solution.

24. A method of manufacturing a catalyst in accordance with claim 23, wherein:
said one or more nickel salts comprises one or more of a salt of acetate, a salt of formate, a salt of carboxylate, a salt of nitrate, a salt of sulfate, a salt of chloride, a salt of carbonate and a salt of halide; and
said aluminate comprises one or more of alkali metal aluminates, lithium aluminate, sodium aluminate and potassium aluminate;
said carbonate and bicarbonate comprise one or more of an alkali metal carbonate, an alkali metal bicarbonate, ammonium carbonate, ammonium bicarbonate, organic amine carbonate and organic amine bicarbonate; and
said base comprises one of an alkali metal hydroxide, alkali metal oxide, ammonium hydroxide and organic ammine hydroxide; and
wherein said alkali metal comprises one or more of lithium, sodium and potassium.

25. A method of manufacturing a catalyst in accordance with any of claims 5-7, comprising the steps of:
providing a first solution comprising one or more nickel salts, wherein said first solution is one of a solution and a dispersion;
providing a second solution comprising at least one of aluminate, carbonate, bicarbonate and a base;
providing a precursor of said third element including one of a salt of said third element, a hydroxide of said third element and an oxide of said third element;
combining said first solution with said precursor of said third element to form a third solution; and
reacting said third solution with said second solution.

26. A method of manufacturing a catalyst in accordance with claim 25,
wherein:
said one or more nickel salts comprises one or more of a salt of acetate, a salt of formate, a salt of carboxylate, a salt of nitrate, a salt of sulfate, a salt of chloride, a salt of carbonate and a salt of halide; and
said aluminate comprises one or more of alkali metal aluminates, lithium aluminate, sodium aluminate and potassium aluminate;
said carbonate and bicarbonate comprise one or more of an alkali metal carbonate, an alkali metal bicarbonate, ammonium carbonate, ammonium bicarbonate, organic amine carbonate and organic amine bicarbonate;
said base comprises one of an alkali metal hydroxide, alkali metal oxide, ammonium hydroxide and organic ammine hydroxide;
said alkali metal comprises one or more of lithium, sodium and potassium;
said third element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal; and
said precursor of said third element comprises one or more of said salt of third element, a dispersion of a hydroxide of said third element and a dispersion of an oxide of said third element, said salt of said third element comprising one of a salt of acetate, a salt of formate, a salt of carboxylate, a salt of nitrate, a salt of sulfate, a salt of chloride, a salt of halide, a salt of oxalate, and a carbonate.

27. A method of manufacturing a catalyst in accordance with claim 26, wherein said third element comprises zirconium and said precursor of said third element comprises one of a zirconium salt, a dispersion of zirconium oxide and a dispersion of zirconium hydroxide, wherein said zirconium salt comprises one of an oxide, a hydroxide, an acetate, a formate, a nitrate, a sulfate, a carboxylate, a chloride, a halide and a carbonate.

28. A method of manufacturing a catalyst in accordance with any of claims 8-10, comprising the steps of:
providing a first solution comprising one or more nickel salts, wherein said first solution is one of a solution and a dispersion;
providing a second solution comprising at least one of aluminate, carbonate, bicarbonate and a base;
providing a precursor of said third element including one of a salt of said third element, a hydroxide of said third element and an oxide of said third element;
providing a precursor of said fourth element including one of a salt of said fourth element, a hydroxide of said fourth element and an oxide of said fourth element;
combining said first solution with said precursor of said third element and said precursor of said fourth element to form a third solution; and
reacting said third solution with said second solution.

29. A method of manufacturing a catalyst in accordance with claim 28,
wherein:
said one or more nickel salts comprises one or more of a salt of acetate, a salt of formate, a salt of carboxylate, a salt of nitrate, a salt of sulfate, a salt of chloride, a salt of carbonate and a salt of halide; and
said aluminate comprises one or more of alkali metal aluminates, lithium aluminate, sodium aluminate and potassium aluminate;
said carbonate and bicarbonate comprise one or more of an alkali metal carbonate, an alkali metal bicarbonate, ammonium carbonate, ammonium bicarbonate, organic amine carbonate and organic amine bicarbonate;
said base comprises one of an alkali metal hydroxide, alkali metal oxide, ammonium hydroxide and organic ammine hydroxide;
said alkali metal comprises one or more of lithium, sodium and potassium;
said third element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said third element comprises one or more of said salt of third element, a dispersion of a hydroxide of said third element and a dispersion of an oxide of said third element, said salt of said third element comprising one of a salt of acetate, a salt of formate, a salt of carboxylate, a salt of nitrate, a salt of sulfate, a salt of chloride, a salt of halide, a salt of oxalate, and a carbonate;
said fourth element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said fourth element comprises one or more of said salt of fourth element, a dispersion of a hydroxide of said fourth element and a dispersion of an oxide of said fourth element, said salt of said fourth element comprising one of a salt of acetate, a salt of formate, a salt of carboxylate, a salt of nitrate, a salt of sulfate, a salt of chloride, a salt of halide, a salt of oxalate, and a carbonate.

30. A method of manufacturing a catalyst in accordance with claim 29,
wherein:
said third element comprises zirconium and said precursor of said third element comprises one of a zirconium salt, a dispersion of zirconium oxide and a dispersion of zirconium hydroxide, wherein said zirconium salt comprises one of an oxide, a hydroxide, an acetate, a formate, a nitrate, a sulfate, a carboxylate, a chloride, a halide and a carbonate; and
said fourth element comprises cerium and said precursor of said fourth element comprises one of a cerium salt, a dispersion of cerium oxide and a dispersion of cerium hydroxide, wherein said cerium salt comprises one of an oxide, a hydroxide, an acetate, a formate, a nitrate, a sulfate, a carboxylate, a chloride, a halide and a carbonate.

31. A method of manufacturing a catalyst in accordance with any of claims 11-13, comprising the steps of:
providing a first solution comprising one or more nickel salts, wherein said first solution is one of a solution and a dispersion;
providing a second solution comprising at least one of aluminate, carbonate, bicarbonate and a base;
providing a precursor of said third element including one of a salt of said third element, a hydroxide of said third element and an oxide of said third element;
providing a precursor of said fourth element including one of a salt of said fourth element, a hydroxide of said fourth element and an oxide of said fourth element;
providing a precursor of said fifth element including one of a salt of said fifth element, a hydroxide of said fifth element and an oxide of said fifth element;
combining said first solution with said precursor of said third element, said precursor of said fourth element and said precursor of said fifth element to form a third solution; and
reacting said third solution with said second solution.

32. A method of manufacturing a catalyst in accordance with claim 31,
wherein:
said one or more nickel salts comprises one or more of a salt of acetate, a salt of formate, a salt of carboxylate, a salt of nitrate, a salt of sulfate, a salt of chloride, a salt of carbonate and a salt of halide; and
said aluminate comprises one or more of alkali metal aluminates, lithium aluminate, sodium aluminate and potassium aluminate;
said carbonate and bicarbonate comprise one or more of an alkali metal carbonate, an alkali metal bicarbonate, ammonium carbonate, ammonium bicarbonate, organic amine carbonate and organic amine bicarbonate;
said base comprises one of an alkali metal hydroxide, alkali metal oxide, ammonium hydroxide and organic ammine hydroxide;
said alkali metal comprises one or more of lithium, sodium and potassium;
said third element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said third element comprises one or more of said salt of third element, a dispersion of a hydroxide of said third element and a dispersion of an oxide of said third element, said salt of said third element comprising one of a salt of acetate, a salt of formate, a salt of carboxylate, a salt of nitrate, a salt of sulfate, a salt of chloride, a salt of halide, a salt of oxalate, and a carbonate;
said fourth element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said fourth element comprises one or more of said salt of fourth element, a dispersion of a hydroxide of said fourth element and a dispersion of an oxide of said fourth element, said salt of said fourth element comprising one of a salt of acetate, a salt of formate, a salt of carboxylate, a salt of nitrate, a salt of sulfate, a salt of chloride, a salt of halide, a salt of oxalate, and a carbonate;
said fifth element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;

said precursor of said fifth element comprises one or more of said salt of fifth element, a dispersion of a hydroxide of said fifth element and a dispersion of an oxide of said fifth element, said salt of said fifth element comprising one of a salt of acetate, a salt of formate, a salt of carboxylate, a salt of nitrate, a salt of sulfate, a salt of chloride, a salt of halide, a salt of oxalate, and a carbonate.

33. A method of manufacturing a catalyst in accordance with claim 32,
wherein:
said third element comprises zirconium and said precursor of said third element comprises one of a zirconium salt, a dispersion of zirconium oxide and a dispersion of zirconium hydroxide, wherein said zirconium salt comprises one of an oxide, a hydroxide, an acetate, a formate, a nitrate, a sulfate, a carboxylate, a chloride, a halide and a carbonate;
said fourth element comprises cerium and said precursor of said fourth element comprises one of a cerium salt, a dispersion of cerium oxide and a dispersion of cerium hydroxide, wherein said cerium salt comprises one of an oxide, a hydroxide, an acetate, a formate, a nitrate, a sulfate, a carboxylate, a chloride, a halide and a carbonate; and
said fifth element comprises silicon and said precursor of said fifth element comprises one of a silicate solution and silica sol.

34. A method of manufacturing a catalyst in accordance with any of claims 14-16, comprising the steps of:
providing a first solution comprising one or more nickel salts, wherein said first solution is one of a solution and a dispersion;
providing a second solution comprising at least one of aluminate, carbonate, bicarbonate and a base;
providing a precursor of said third element including one of a salt of said third element, a hydroxide of said third element and an oxide of said third element;
providing a precursor of said fourth element including one of a salt of said fourth element, a hydroxide of said fourth element and an oxide of said fourth element;
providing a precursor of said fifth element including one of a salt of said fifth element, a hydroxide of said fifth element and an oxide of said fifth element;
providing a precursor of said sixth element including one of a salt of said sixth element, a hydroxide of said sixth element and an oxide of said sixth element;
combining said first solution with said precursor of said third element, said precursor of said fourth element, said precursor of said fifth element and said precursor of said sixth element to form a third solution; and
reacting said third solution with said second solution.

35. A method of manufacturing a catalyst in accordance with claim 34,
wherein:
said one or more nickel salts comprises one or more of a salt of acetate, a salt of formate, a salt of carboxylate, a salt of nitrate, a salt of sulfate, a salt of chloride, a salt of carbonate and a salt of halide; and
said aluminate comprises one or more of alkali metal aluminates, lithium aluminate, sodium aluminate and aluminate;
said carbonate and bicarbonate comprise one or more of an alkali metal carbonate, an alkali metal bicarbonate, ammonium carbonate, ammonium bicarbonate, organic amine carbonate and organic amine bicarbonate;
said base comprises one of an alkali metal hydroxide, alkali metal oxide, ammonium hydroxide and organic ammine hydroxide;
said alkali metal comprises one or more of lithium, sodium and potassium;
said third element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said third element comprises one or more of said salt of third element, a dispersion of a hydroxide of said third element and a dispersion of an oxide of said third element, said salt of said third element comprising one of a salt of acetate, a salt of formate, a salt of carboxylate, a salt of nitrate, a salt of sulfate, a salt of chloride, a salt of halide, a salt of oxalate, and a carbonate;
said fourth element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said fourth element comprises one or more of said salt of fourth element, a dispersion of a hydroxide of said fourth element and a dispersion of an oxide of said fourth element, said salt of said fourth element comprising one of a salt of acetate, a salt of formate, a salt of carboxylate, a salt of nitrate, a salt of sulfate, a salt of chloride, a salt of halide, a salt of oxalate, and a carbonate;
said fifth element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said fifth element comprises one or more of said salt of fifth element, a dispersion of a hydroxide of said fifth element and a dispersion of an oxide of said fifth element, said salt of said fifth element comprising one of a salt of acetate, a salt of formate, a salt of carboxylate, a salt of nitrate, a salt of sulfate, a salt of chloride, a salt of halide, a salt of oxalate, and a carbonate
said sixth element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said sixth element comprises one or more of said salt of sixth element, a dispersion of a hydroxide of said sixth element and a dispersion of an oxide of said sixth element, said salt of said sixth element comprising one of a salt of acetate, a salt of formate, a salt of carboxylate, a salt of nitrate, a salt of sulfate, a salt of chloride, a salt of halide, a salt of oxalate, and a carbonate.

36. A method of manufacturing a catalyst in accordance with claim 35,
wherein:
said third element comprises zirconium and said precursor of said third element comprises one of a zirconium salt, a dispersion of zirconium oxide and a dispersion of zirconium hydroxide, wherein said zirconium salt comprises one of an oxide, a hydroxide, an acetate, a formate, a nitrate, a sulfate, a carboxylate, a chloride, a halide and a carbonate;

said fourth element comprises cerium and said precursor of said fourth element comprises one of a cerium salt, a dispersion of cerium oxide and a dispersion of cerium hydroxide, wherein said cerium salt comprises one of an oxide, a hydroxide, an acetate, a formate, a nitrate, a sulfate, a carboxylate, a chloride, a halide and a carbonate;

said fifth element comprises neodymium and said precursor of said fifth element comprises one of a neodymium salt, a dispersion of neodymium oxide and a dispersion of neodymium hydroxide, wherein said neodymium salt comprises one of an oxide, a hydroxide, an acetate, a formate, a nitrate, a sulfate, a carboxylate, a chloride, a halide and a carbonate; and said sixth element comprises praseodymium and said precursor of said sixth element comprises one of praseodymium salt, a dispersion of praseodymium oxide and a dispersion of praseodymium hydroxide, wherein said praseodymium salt comprises one of an oxide, a hydroxide, an acetate, a formate, a nitrate, a sulfate, a carboxylate, a chloride, a halide and a carbonate.

37. A method of manufacturing a catalyst in accordance with any of claims 17-19, comprising the steps of:
providing a first solution comprising one or more nickel salts, wherein said first solution is one of a solution and a dispersion;
providing a second solution comprising at least one of aluminate, carbonate, bicarbonate and a base;
providing a precursor of said third element including one of a salt of said third element, a hydroxide of said third element and an oxide of said third element;
providing a precursor of said fourth element including one of a salt of said fourth element, a hydroxide of said fourth element and an oxide of said fourth element;
providing a precursor of said fifth element including one of a salt of said fifth element, a hydroxide of said fifth element and an oxide of said fifth element;
providing a precursor of said sixth element including one of a salt of said sixth element, a hydroxide of said sixth element and an oxide of said sixth element;
providing a precursor of said seventh element including one of a salt of said seventh element, a hydroxide of said seventh element and an oxide of said seventh element;
combining said first solution with said precursor of said third element, said precursor of said fourth element, said precursor of said fifth element, said precursor of said sixth element and said precursor of said seventh element to form a third solution; and
reacting said third solution with said second solution.

38. A method of manufacturing a catalyst in accordance with claim 37,
wherein:
said one or more nickel salts comprises one or more of a salt of acetate, a salt of formate, a salt of carboxylate, a salt of nitrate, a salt of sulfate, a salt of chloride, a salt of carbonate and a salt of halide; and
said aluminate comprises one or more of alkali metal aluminates, lithium aluminate, sodium aluminate and potassium aluminate;
said carbonate and bicarbonate comprise one or more of an alkali metal carbonate, an alkali metal bicarbonate, ammonium carbonate, ammonium bicarbonate, organic amine carbonate and organic amine bicarbonate;
said base comprises one of an alkali metal hydroxide, alkali metal oxide, ammonium hydroxide and organic ammine hydroxide;
said alkali metal comprises one or more of lithium, sodium and potassium;
said third element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said third element comprises one or more of said salt of third element, a dispersion of a hydroxide of said third element and dispersion of an oxide of said third element, said salt of said third element comprising one of a salt of acetate, a salt of formate, a salt of carboxylate, a salt of nitrate, a salt of sulfate, a salt of chloride, a salt of halide, a salt of oxalate, and a carbonate;
said fourth element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said fourth element comprises one or more of said salt of fourth element, a dispersion of a hydroxide of said fourth element and a dispersion of an oxide of said fourth element, said salt of said fourth element comprising one of a salt of acetate, a salt of formate, a salt of carboxylate, a salt of nitrate, a salt of sulfate, a salt of chloride, a salt of halide, a salt of oxalate, and a carbonate;
said fifth element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said fifth element comprises one or more of said salt of fifth element, a dispersion of a hydroxide of said fifth element and a dispersion of an oxide of said fifth element, said salt of said fifth element comprising one of a salt of acetate, a salt of formate, a salt of carboxylate, a salt of nitrate, a salt of sulfate, a salt of chloride, a salt of halide, a salt of oxalate, and a carbonate
said sixth element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said sixth element comprises one or more of said salt of sixth element, a dispersion of a hydroxide of said sixth element and a dispersion of an oxide of said sixth element, said salt of said sixth element comprising one of a salt of acetate, a salt of formate, a salt of carboxylate, a salt of nitrate, a salt of sulfate, a salt of chloride, a salt of halide, a salt of oxalate, and a carbonate;
said seventh element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said seventh element comprises one or more of said salt of seventh element, a dispersion of a hydroxide of said seventh element and a dispersion of an oxide of said seventh element, said salt of said seventh element comprising one of a salt of acetate, a salt of formate, a salt of carboxylate, a salt of nitrate, a salt of sulfate, a salt of chloride, a salt of halide, a salt of oxalate, and a carbonate.

39. A method of manufacturing a catalyst in accordance with claim 38,
wherein:
said third element comprises zirconium and said precursor of said third element comprises one of a zirconium salt, a dispersion of zirconium oxide and a dispersion of zirconium hydroxide, wherein said zirconium salt comprises one of an oxide, a hydroxide, an acetate, a formate, a nitrate, a sulfate, a carboxylate, a chloride, a halide and a carbonate;
said fourth element comprises cerium and said precursor of said fourth element comprises one of a cerium salt, a dispersion of cerium oxide and a dispersion of cerium hydroxide, wherein said cerium salt comprises one of an oxide, a hydroxide, an acetate, a formate, a nitrate, a sulfate, a carboxylate, a chloride, a halide and a carbonate;
said fifth element comprises barium and said precursor of said fifth element comprises one of a barium salt, a dispersion of barium oxide and a dispersion of barium hydroxide, wherein said barium salt comprises one of an oxide, a hydroxide, an acetate, a formate, a nitrate, a sulfate, a carboxylate, a chloride, a halide and a carbonate;
said sixth element comprises strontium and said precursor of said sixth element comprises one of strontium salt, a dispersion of strontium oxide and a dispersion of strontium hydroxide, wherein said strontium salt comprises one of an oxide, a hydroxide, an acetate, a formate, a nitrate, a sulfate, a carboxylate, a chloride, a halide and a carbonate; and
said seventh element comprises titanium and said precursor of said sixth element comprises one of titanium salt, a dispersion of titanium oxide and a dispersion of titanium hydroxide, wherein said titanium salt comprises one of an oxide, a hydroxide, an acetate, a formate, a nitrate, a sulfate, a carboxylate, a chloride, a halide and a carbonate.

40. A method of manufacturing a catalyst in accordance with any of claims 20-22, comprising the steps of:
providing a first solution comprising one or more nickel salts, wherein said first solution is one of a solution and a dispersion;
providing a second solution comprising at least one of aluminate, carbonate, bicarbonate and a base;
providing a precursor of said third element including one of a salt of said third element, a hydroxide of said third element and an oxide of said third element;
providing a precursor of said fourth element including one of a salt of said fourth element, a hydroxide of said fourth element and an oxide of said fourth element;
providing a precursor of said fifth element including one of a salt of said fifth element, a hydroxide of said fifth element and an oxide of said fifth element;
providing a precursor of said sixth element including one of a salt of said sixth element, a hydroxide of said sixth element and an oxide of said sixth element;
providing a precursor of said seventh element including one of a salt of said seventh element, a hydroxide of said seventh element and an oxide of said seventh element;
providing a precursor of an additional element including one of a salt of said additional element, a hydroxide of said additional element and an oxide of said additional element;
combining said first solution with said precursor of said third element, said precursor of said fourth element, said precursor of said fifth element, said precursor of said sixth element, said precursor of said seventh element and said precursor of said additional element to form a third solution; and
reacting said third solution with said second solution.

41. A method of manufacturing a catalyst in accordance with claim 40,
wherein:
said one or more nickel salts comprises one or more of a salt of acetate, a salt of formate, a salt of carboxylate, a salt of nitrate, a salt of sulfate, a salt of chloride, a salt of carbonate and a salt of halide; and
said aluminate comprises an alkali metal aluminate, aluminate and aluminate;
said carbonate and bicarbonate comprise one or more of an alkali metal carbonate, an alkali metal bicarbonate, ammonium carbonate, ammonium bicarbonate, organic amine carbonate and organic amine bicarbonate;
said base comprises one of an alkali metal hydroxide, alkali metal oxide, ammonium hydroxide and organic ammine hydroxide;
said alkali metal comprises one or more of lithium, sodium and potassium;
said third element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said third element comprises one or more of said salt of third element, a dispersion of a hydroxide of said third element and a dispersion of an oxide of said third element, said salt of said third element comprising one of a salt of acetate, a salt of formate, a salt of carboxylate, a salt of nitrate, a salt of sulfate, a salt of chloride, a salt of halide, a salt of oxalate, and a carbonate;
said fourth element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said fourth element comprises one or more of said salt of fourth element, a dispersion of a hydroxide of said fourth element and a dispersion of an oxide of said fourth element, said salt of said fourth element comprising one of a salt of acetate, a salt of formate, a salt of carboxylate, a salt of nitrate, a salt of sulfate, a salt of chloride, a salt of halide, a salt of oxalate, and a carbonate;
said fifth element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;
said precursor of said fifth element comprises one or more of said salt of fifth element, a dispersion of a hydroxide of said fifth element and a dispersion of an oxide of said fifth element, said salt of said fifth element comprising one of a salt of acetate, a salt of formate, a salt of carboxylate, a salt of nitrate, a salt of sulfate, a salt of chloride, a salt of halide, a salt of oxalate, and a carbonate
said sixth element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;

said precursor of said sixth element comprises one or more of said salt of sixth element, a dispersion of a hydroxide of said sixth element and a dispersion of an oxide of said sixth element, said salt of said sixth element comprising one of a salt of acetate, a salt of formate, a salt of carboxylate, a salt of nitrate, a salt of sulfate, a salt of chloride, a salt of halide, a salt of oxalate, and a carbonate;

said seventh element comprises one of zirconium, titanium, hafnium, silicon, boron, gallium, tin, antimony, bismuth, yttrium, lanthanum, cerium, praseodium, neodymium, a rare earth metal, an alkali earth metal and a transition metal;

said precursor of said seventh element comprises one or more of said salt of seventh element, a dispersion of a hydroxide of said seventh element and a dispersion of an oxide of said seventh element, said salt of said seventh element comprising one of a salt of acetate, a salt of formate, a salt of carboxylate, a salt of nitrate, a salt of sulfate, a salt of chloride, a salt of halide, a salt of oxalate, and a carbonate;

said one or more additional elements comprise one of more of zirconium, titanium, hafnium, silicon, boron, gallium, tin, antimony, bismuth, yttrium, lanthanum, cerium, praseodium, neodymium, a rare earth metal, an alkali earth metal and a transition metal;

said precursor of said one or more additional elements comprises one or more of said salt of one or more additional elements, a dispersion of a hydroxide of said one or more additional elements and a dispersion of an oxide of said one or more of additional elements, said salt of said one or more additional elements comprising one of a salt of acetate, a salt of formate, a salt of carboxylate, a salt of nitrate, a salt of sulfate, a salt of chloride, a salt of halide, a salt of oxalate, and a carbonate.

* * * * *